United States Patent
Wu et al.

(10) Patent No.: US 11,722,272 B2
(45) Date of Patent: Aug. 8, 2023

(54) METHOD AND DEVICE IN A NODE USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/841,643

(22) Filed: Jun. 15, 2022

(65) Prior Publication Data
US 2022/0311570 A1    Sep. 29, 2022

Related U.S. Application Data

(63) Continuation of application No. 17/207,772, filed on Mar. 22, 2021, now Pat. No. 11,405,153, which is a
(Continued)

(30) Foreign Application Priority Data

Jan. 2, 2020    (CN) .......................... 202010001128.5

(51) Int. Cl.
*H04L 5/00* (2006.01)
*H04W 28/20* (2009.01)

(52) U.S. Cl.
CPC .......... *H04L 5/0046* (2013.01); *H04L 5/0053* (2013.01); *H04W 28/20* (2013.01)

(58) Field of Classification Search
CPC ......... H04L 5/00; H04L 5/003; H04L 5/0037; H04L 5/0039; H04L 5/0041;
(Continued)

(56) References Cited

U.S. PATENT DOCUMENTS

| | | | |
|---|---|---|---|
| 2013/0301549 A1* | 11/2013 | Chen ..................... | H04L 5/1469 370/329 |
| 2014/0036813 A1* | 2/2014 | Lunttila ................ | H04W 72/04 370/329 |

(Continued)

FOREIGN PATENT DOCUMENTS

| | | | | |
|---|---|---|---|---|
| CA | 3036486 A1 * | 12/2018 | ............ | H04W 48/02 |
| CA | 3024596 A1 * | 5/2019 | ............... | H04B 7/06 |

(Continued)

OTHER PUBLICATIONS

CN 1st office action received in application No. 202010001128.5 dated May 6, 2022.
(Continued)

*Primary Examiner* — Kevin D Mew

(57) ABSTRACT

Present disclosure discloses method and device in a node used for wireless communication. A first node receives a first information block and a first signaling; and operates a first signal. The first information block is used for determining M first-type indexes out of N first-type indexes; the M first-type indexes are used for determining M1 information elements out of N1 information elements, and for determining M2 information elements out of N2 information elements; the first signaling comprises scheduling information of the first signal, and a first information element is used for determining Rx/Tx parameters of the first signal; when the operating is receiving, the first signaling indicates the first information element out of the M1 information elements; when the operating is transmitting, the first signaling indicates the first information element out of the M2 information elements. The above method streamlines beam management and improves the performance of uplink data transmission.

20 Claims, 5 Drawing Sheets

Related U.S. Application Data continuation of application No. PCT/CN2020/139244, filed on Dec. 25, 2020.

(58) Field of Classification Search
CPC ... H04L 5/0046; H04L 5/0053; H04L 5/0091; H04L 5/0092; H04L 5/0094; H04L 5/0096; H04L 5/0098; H04W 28/18; H04W 28/20

See application file for complete search history.

(56) References Cited

U.S. PATENT DOCUMENTS

| | | | | |
|---|---|---|---|---|
| 2018/0049113 | A1* | 2/2018 | Jung | H04L 47/806 |
| 2019/0104516 | A1* | 4/2019 | Oh | H04W 72/21 |
| 2019/0281587 | A1* | 9/2019 | Zhang | H04W 72/23 |
| 2019/0297603 | A1* | 9/2019 | Guo | H04L 5/0051 |
| 2019/0349964 | A1* | 11/2019 | Liou | H04L 5/0094 |
| 2019/0379506 | A1* | 12/2019 | Cheng | H04L 1/0038 |
| 2019/0394662 | A1 | 12/2019 | Josan et al. | |
| 2020/0014510 | A1* | 1/2020 | Wu | H04W 72/23 |
| 2020/0296726 | A1* | 9/2020 | Wu | H04W 72/12 |
| 2020/0366446 | A1* | 11/2020 | Matsumura | H04W 72/1273 |
| 2021/0022128 | A1* | 1/2021 | Chen | H04W 72/046 |
| 2022/0060296 | A1* | 2/2022 | Wu | H04L 5/0094 |

FOREIGN PATENT DOCUMENTS

| | | | | |
|---|---|---|---|---|
| CA | 3056608 | A1 * | 3/2020 | H04B 7/0695 |
| CA | 3060836 | A1 * | 5/2020 | H04W 72/042 |
| CA | 3090242 | A1 * | 2/2021 | H04W 72/0413 |
| CN | 110535617 | A | 12/2019 | |
| EP | 3236705 | A1 * | 10/2017 | H04L 5/001 |
| EP | 3716723 | A1 * | 9/2020 | H04W 74/08 |
| WO | 2019109345 | A1 | 6/2019 | |
| WO | 2019134656 | A1 | 7/2019 | |

OTHER PUBLICATIONS

CN 1st Search Report received in application No. 202010001128.5 dated Apr. 26, 2022.
3GPP tsg_ran\wg1 rl1 , Aug. 10, 2018, "Beam R1-1809423 management for NR".
International Search Report received in application No. PCT/CN2020/139244 dated Apr. 6, 2021.

* cited by examiner

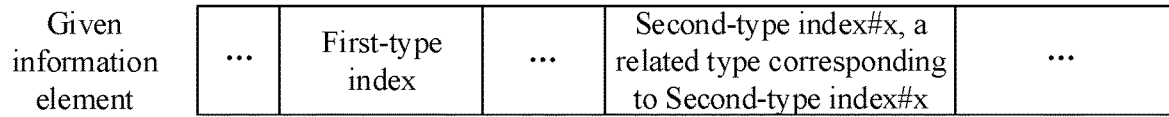
FIG. 8
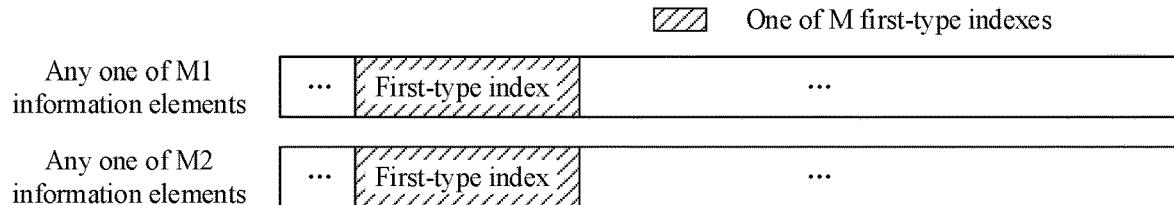
FIG. 9
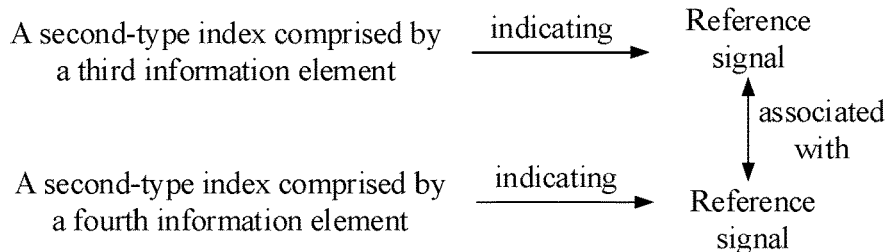
FIG. 10
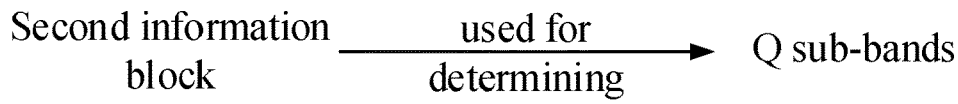
FIG. 11
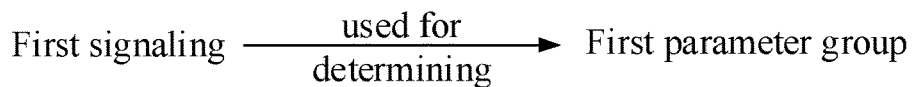
FIG. 12
Transmitting power of first signal = min(first reference power, first power threshold)
FIG. 13
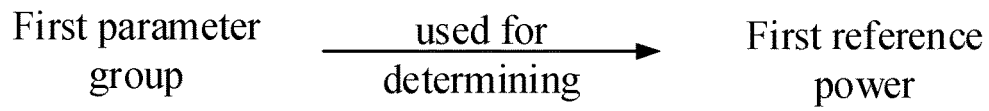
FIG. 14

METHOD AND DEVICE IN A NODE USED FOR WIRELESS COMMUNICATION

CROSS REFERENCE TO RELATED APPLICATIONS

This application is a continuation of the U.S. patent application Ser. No. 17/207,772, filed on Mar. 22,2021, which is a continuation of International Application No. PCT/CN2020/139244, filed Dec. 25, 2020, claims the priority benefit of Chinese Patent Application No. 202010001128.5, filed on Jan. 2, 2020, the full disclosure of which is incorporated herein by reference.

BACKGROUND

Technical Field

The present disclosure relates to transmission methods and devices in wireless communication systems, and in particular to a method and device of radio signal transmission in a wireless communication system that support cellular networks.

Related Art

As a key technique in both 3rd Generation Partner Project (3GPP) Long-term Evolution (LTE) and New Radio (NR) systems, MIMO is featured by configuring multiple antennas at the communication node, for instance, at a base station or a User Equipment (UE) to acquire extra spatial degrees of freedom. The multiple antennas form through beamforming a beam pointing in a specific direction to improve communication quality. When the antennas belong to multiple Transmitter Receiver Points (TRPs)/panels, the spatial differences among these TRPs/panels can be utilized to get extra diversity gains. Since the beam formed through beamforming of multiple antennas is usually narrow, beams from both sides of communication shall be aligned to enable effective communication. When UE mobility or other factors lead to the out-of-step of a transmitting/receiving beam, the communications will face a large decline in quality or even communication failure. So, beam management is proposed in NR Release (R) 15 and R16 for beam selection and updating between two communication sides, thus achieving performance gains brought by MIMO.

SUMMARY

Inventors find through researches that in NR R15 and R16, mechanisms employed for uplink beam management and downlink beam management are different, which increases the system complexity and has a negative impact on signaling overhead and delay, and the performance of uplink transmission will be constrained due to such a difference. Therefore, how to enhance beam management to ameliorate the situation has become an urgent problem to be solved.

To address the above problem, the present disclosure provides a solution. It should be noted that though the present disclosure only took the cellular communication scenario for example in the statement above, it is also applicable to other scenarios such as sidelink communications where similar technical effect can be achieved; additionally, the adoption of a unified solution for various scenarios (including but not limited to sidelink communications and cellular communications) contributes to the reduction of hardcore complexity and costs. If no conflict is incurred, embodiments in a first node in the present disclosure and the characteristics of the embodiments are also applicable to a second node, and vice versa. What's more, the embodiments in the present disclosure and the characteristics in the embodiments can be arbitrarily combined if there is no conflict.

The present disclosure provides a method in a first node for wireless communications, comprising:
  receiving a first information block;
  receiving a first signaling; and
  operating a first radio signal;
  herein, the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the operating action is receiving or transmitting; when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal.

In one embodiment, a problem in the present disclosure includes how to unify and streamline uplink and downlink beam management mechanisms. By combined designing of uplink and downlink TCI state activations, the above method manages to solve the problem.

In one embodiment, the above method is characterized in comprising: the N1 information elements and the N2 information elements are respectively TCI states configured for downlink data transmissions and uplink data transmissions, and the first information block activates some TCI states of the N1 information elements and N2 information elements at the same time.

In one embodiment, an advantage of the above method lies in streamlining beam management to reduce signaling overhead and delay incurred therein, thus enhancing the performance of uplink data transmission.

According to one aspect of the present disclosure, a first-type index comprised by any information element of the M1 information elements is one of the M first-type indexes, while a first-type index comprised by any information element of the M2 information elements is one of the M first-type indexes.

According to one aspect of the present disclosure, a third information element is any information element of the M1 information elements; when there is a fourth information element in the M2 information elements that comprises a first-type index equal to a first-type index comprised by the third information element, a reference signal indicated by a second-type index comprised by the third information element is associated with a reference signal indicated by a second-type index comprised by the fourth information element.

According to one aspect of the present disclosure, comprising:

receiving a second information block;

herein, the second information block is used to determine Q sub-bands, Q being a positive integer greater than 1; the first signal belongs to one of the Q sub-bands in frequency domain.

According to one aspect of the present disclosure, when the operating action is transmitting, the first signaling is used to determine a first parameter group; the first parameter group is used to determine a first reference power, the first reference power being used to determine a transmitting power of the first signal.

According to one aspect of the present disclosure, comprising:

receiving a first-type reference signal;

herein, the first-type reference signal is transmitted in a first-type reference signal resource, and a second-type index set comprised by the first information element indicates the first-type reference signal resource; when the operating action is receiving, the first-type reference signal is used to determine large-scale properties of a wireless channel over which the first signal is conveyed; when the operating action is transmitting, the first-type reference signal is used to determine the Tx parameters of the first signal.

According to one aspect of the present disclosure, comprising:

transmitting a first-type reference signal;

herein, the first-type reference signal is transmitted in a first-type reference signal resource, and a second-type index set comprised by the first information element indicates the first-type reference signal resource; when the operating action is receiving, the first-type reference signal is used to determine large-scale properties of a wireless channel over which the first signal is conveyed; when the operating action is transmitting, the first-type reference signal is used to determine the Tx parameters of the first signal.

According to one aspect of the present disclosure, comprising:

receiving a third information block;

herein, the third information block is used to determine the N1 information elements and the N2 information elements.

According to one aspect of the present disclosure, the first node is a UE.

According to one aspect of the present disclosure, the first node is a relay node.

The present disclosure provides a method in a second node for wireless communications, comprising:

transmitting a first information block;

transmitting a first signaling; and processing a first signal;

herein, the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the processing action is transmitting or receiving; when the processing action is transmitting, the first signaling indicates the first information element out of the M1 information elements, and a second-type index set comprised by the first information element is used to determine Rx parameters of the first signal; when the processing action is receiving, the first signaling indicates the first information element out of the M2 information elements, and a second-type index set comprised by the first information element is used to determine Tx parameters of the first signal.

According to one aspect of the present disclosure, a first-type index comprised by any information element of the M1 information elements is one of the M first-type indexes, while a first-type index comprised by any information element of the M2 information elements is one of the M first-type indexes.

According to one aspect of the present disclosure, a third information element is any information element of the M1 information elements; when there is a fourth information element in the M2 information elements that comprises a first-type index equal to a first-type index comprised by the third information element, a reference signal indicated by a second-type index comprised by the third information element is associated with a reference signal indicated by a second-type index comprised by the fourth information element.

According to one aspect of the present disclosure, comprising:

transmitting a second information block;

herein, the second information block is used to determine Q sub-bands, Q being a positive integer greater than 1; the first signal belongs to one of the Q sub-bands in frequency domain.

According to one aspect of the present disclosure, when the processing action is receiving, the first signaling is used to determine a first parameter group; the first parameter group is used to determine a first reference power, the first reference power being used to determine a transmitting power of the first signal.

According to one aspect of the present disclosure, comprising:

transmitting a first-type reference signal;

herein, the first-type reference signal is transmitted in a first-type reference signal resource, and a second-type index set comprised by the first information element indicates the first-type reference signal resource; when the processing action is transmitting, the first-type reference signal is used to determine large-scale properties of a wireless channel over which the first signal is conveyed; when the processing action is receiving, the first-type reference signal is used to determine the Tx parameters of the first signal.

According to one aspect of the present disclosure, comprising:

receiving a first-type reference signal;

herein, the first-type reference signal is transmitted in a first-type reference signal resource, and a second-type index set comprised by the first information element indicates the first-type reference signal resource; when the processing action is transmitting, the first-type reference signal is used to determine large-scale properties of a wireless channel over which the first signal is conveyed; when the processing action is receiving, the first-type reference signal is used to determine the Tx parameters of the first signal.

According to one aspect of the present disclosure, comprising:

transmitting a third information block;

herein, the third information block is used to determine the N1 information elements and the N2 information elements.

According to one aspect of the present disclosure, the second node is a base station.

According to one aspect of the present disclosure, the second node is a UE.

According to one aspect of the present disclosure, the second node is a relay node.

The present disclosure provides a first node for wireless communications, comprising:

a first receiver, which receives a first information block and a first signaling; and a first processor, which operates a first signal;

herein, the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the operating action is receiving or transmitting; when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal.

The present disclosure provides a second node for wireless communications, comprising:

a first transmitter, which transmits a first information block and a first signaling; and a second processor, which processes a first signal;

herein, the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the processing action is transmitting or receiving; when the processing action is transmitting, the first signaling indicates the first information element out of the M1 information elements, and a second-type index set comprised by the first information element is used to determine Rx parameters of the first signal; when the processing action is receiving, the first signaling indicates the first information element out of the M2 information elements, and a second-type index set comprised by the first information element is used to determine Tx parameters of the first signal.

In one embodiment, the present disclosure is advantageous over the prior art in the following aspects:

Beam management is streamlined, which leads to lower signaling overhead and delay.

The performance of uplink data transmission is improved.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram of a given information element according to one embodiment of the present disclosure.

FIG. 9 illustrates a schematic diagram of M first-type indexes being used to determine M1 information elements and M2 information elements according to one embodiment of the present disclosure.

FIG. 10 illustrates a schematic diagram of a third information element and a fourth information element according to one embodiment of the present disclosure.

FIG. 11 illustrates a schematic diagram of a second information block according to one embodiment of the present disclosure.

FIG. 12 illustrates a schematic diagram of a first signaling being used to determine a first parameter group according to one embodiment of the present disclosure.

FIG. 13 illustrates a schematic diagram of a first reference power being used to determine a transmitting power of a first signal according to one embodiment of the present disclosure.

FIG. 14 illustrates a schematic diagram of a first reference power according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
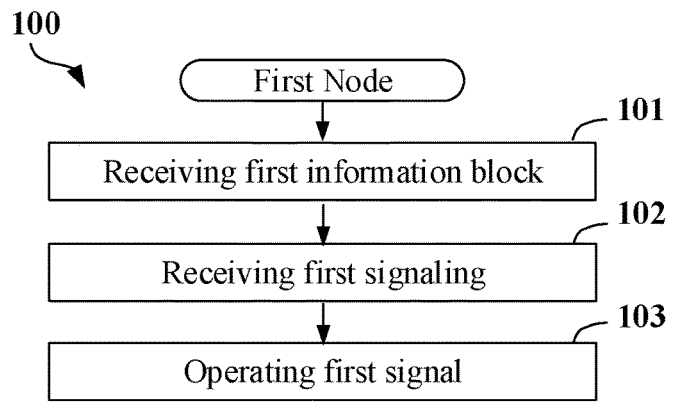
FIG. 1 illustrates a flowchart of a first information block, a first signaling and a first signal according to one embodiment of the present disclosure.

Embodiment 1 illustrates a flowchart of a first information block, a first signaling and a first signal according to one embodiment of the present disclosure, as shown in FIG. 1. In step 100 illustrated by FIG. 1, each box represents a step. Particularly, the sequence of steps marked by different boxes does not necessarily represent specific chronological orders of respective steps.

In Embodiment 1, the first node in the present disclosure receives a first information block in step 101; receives a first signaling in step 102; and operates a first signal in step 103. Herein, the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the operating action is receiving or transmitting; when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal.

In one embodiment, the operating action is receiving, the first signaling indicates the first information element out of the M1 information elements, and a second-type index set comprised by the first information element is used to determine Rx parameters of the first signal.

In one embodiment, the operating action is transmitting, the first signaling indicates the first information element out of the M2 information elements, and a second-type index set comprised by the first information element is used to determine Tx parameters of the first signal.

In one embodiment, the first information block is carried by a higher layer signaling.

In one embodiment, the first information block is carried by a Radio Resource Control (RRC) signaling.

In one embodiment, the first information block is carried by a Medium Access Control layer Control Element (MAC CE) signaling.

In one embodiment, the first information block is transmitted in SideLink.

In one embodiment, the first information block is transmitted in Downlink.

In one embodiment, the first information block indicates a Transmission Configuration Indicator (TCI) codepoint corresponding to each first-type index of the M first-type indexes.

In one embodiment, the first information block indicates the M first-type indexes out of the N first-type indexes.

In one embodiment, the first information block is used to activate the M first-type indexes of the N first-type indexes.

In one embodiment, the first information block is used to deactivate (N-M) first-type index(es) of the N first-type indexes other than the M first-type indexes.

In one embodiment, the first information block comprises a MAC CE.

In one embodiment, the first information block comprises a MAC CE used for activating/deactivating TCI state of a physical shared channel.

In one subembodiment of the above embodiment, the physical shared channel comprises a Physical Downlink Shared CHannel (PDSCH).

In one subembodiment of the above embodiment, the physical shared channel comprises a Physical Uplink Shared CHannel (PUSCH).

In one embodiment, M is less than N.

In one embodiment, M is equal to N.

In one embodiment, M is a positive integer no greater than 8.

In one embodiment, N is equal to one of 4, 8, 16, 32, 64 or 128.

In one embodiment, N is configured by a higher layer signaling.

In one embodiment, N is configured by an RRC signaling.

In one embodiment, any first-type index of the N first-type indexes is a non-negative integer.

In one embodiment, any two first-type indexes of the N first-type indexes are unequal.

In one embodiment, the N first-type indexes are respectively equal to 0, 1 . . . and N−1.

In one embodiment, any first-type index of the N first-type indexes is a TCI-StateId.

In one embodiment, the detailed definition of the TCI-StateId can be found in 3GPP TS38.321 and 3GPP TS38.331.

In one embodiment, the first signaling is a dynamic signaling.

In one embodiment, the first signaling is a first layer (L1) signaling.

In one embodiment, the first signaling is a first layer (L1) control signaling.

In one embodiment, the first signaling comprises Downlink Control Information (DCI).

In one embodiment, the first signaling comprises one or more fields of a piece of DCI.

In one embodiment, the first signaling comprises Sidelink Control Information (SCI).

In one embodiment, the first signaling comprises one or more fields of a piece of SCI.

In one embodiment, the first signaling is transmitted in SideLink.

In one embodiment, the first signaling is transmitted in DownLink.

In one embodiment, when the operating action is receiving, the first signaling comprises DCI used for DownLink Grant.

In one embodiment, when the operating action is transmitting, the first signaling comprises DCI used for UpLink Grant.

In one embodiment, when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal.

In one embodiment, when the operating action is receiving, the first information element is one of the M1 information elements; when the operating action is transmitting, the first information element is one of M2 information elements.

In one embodiment, the first signal is a radio signal.

In one embodiment, the first signal is a baseband signal.

In one embodiment, the first signal is transmitted in SideLink.

In one embodiment, the first signal is transmitted in Downlink or Uplink.

In one embodiment, the first signal carries a Transport Block (TB), a Code Block (CB) or a Code Block Group (CBG).

In one embodiment, the scheduling information comprises one or more of occupied time-domain resources, occupied frequency-domain resources, a Modulation and Coding Scheme (MCS), configuration information of DeModulation Reference Signals (DMRS), a Hybrid Automatic Repeat reQuest (HARD) process number, a Redundancy Version (RV) or a New Data Indicator (NDI).

In one embodiment, M1 is less than M.

In one embodiment, M1 is equal to M.

In one embodiment, the M1 information elements are sequentially arranged according to sizes of respectively comprised first-type indexes.

In one embodiment, M2 is less than M.

In one embodiment, M2 is equal to M.

In one embodiment, the M2 information elements are sequentially arranged according to sizes of respectively comprised first-type indexes.

In one embodiment, the first signaling explicitly indicates the first information element.

In one embodiment, the first signaling implicitly indicates the first information element.

In one embodiment, when the operating action is receiving, the first signaling indicates an index of the first information element in the M1 information elements; when the operating action is transmitting, the first signaling indicates an index of the first information element in the M2 information elements.

In one embodiment, the first signaling indicates a TCI codepoint corresponding to a first-type index comprised by the first information element.

In one embodiment, the first signaling comprises a fourth field, and the fourth field of the first signaling indicates the first information element.

In one subembodiment, when the operating action is receiving, the fourth field of the first signaling indicates an index of the first information element in the M1 information elements; when the operating action is transmitting, the fourth field of the first signaling indicates an index of the first information element in the M2 information elements.

In one subembodiment, the fourth field of the first signaling comprises part of or all information in a TCI field.

In one subembodiment, the fourth field of the first signaling indicates a TCI.

In one subembodiment, the fourth field of the first signaling comprises 3 bits.

In one embodiment, M2 is equal to M1.

In one embodiment, M2 is unequal to M1.

In one embodiment, the M1 information elements are used for Downlink, while the M2 information elements are used for Uplink.

In one embodiment, the M1 information elements are used for SideLink of which a transmitter is the first node, while the M2 information elements are used for SideLink of which a receiver includes the first node.

In one embodiment, any information element of the M1 information elements is different from any of the M2 information elements.

In one embodiment, there is one information element in the M1 information elements that belongs to the M2 information elements.

In one embodiment, M1 is equal to M2, the M1 information elements respectively being the M2 information elements.

In one embodiment, N1 is a positive integer no less than M1 and no greater than N.

In one embodiment, N2 is a positive integer no less than M2 and no greater than N.

In one embodiment, N1 is equal to M1.

In one embodiment, N1 is greater than M1.

In one embodiment, N1 is equal to N.

In one embodiment, N1 is less than N.

In one embodiment, N2 is equal to M2.

In one embodiment, N2 is greater than M2.

In one embodiment, N2 is equal to N.

In one embodiment, N2 is less than N.

In one embodiment, N1 is equal to N2.

In one embodiment, N1 is unequal to N2.

In one embodiment, any information element of the N1 information elements comprises a first-type index and a second-type index set, while any information element of the N2 information elements comprises a first-type index and a second-type index set.

In one embodiment, any information element of the N1 information elements and the N2 information elements comprises information in all or part of fields of an Information Element (IE).

In one embodiment, any information element of the N1 information elements and the N2 information elements comprises information in all or part of fields of a TCI-State IE.

In one embodiment, any information element of the N1 information elements and the N2 information elements is a TCI-State IE.

In one embodiment, the detailed definition of the TCI-State IE can be found in 3GPP TS38.331.

In one embodiment, any information element of the N1 information elements is different from any one of the N2 information elements.

In one embodiment, there is one information element in the N1 information elements that belongs to the N2 information elements.

In one embodiment, N1 is equal to N2, the N1 information elements respectively being the N2 information elements.

In one embodiment, N1 is no greater than a first threshold, and N2 is no greater than a second threshold; the first threshold and the second threshold are positive integers, respectively.

In one subembodiment, the first threshold is configured by an RRC signaling.

In one subembodiment, the second threshold is configured by an RRC signaling.

In one subembodiment, the first threshold is equal to the second threshold.

In one subembodiment, the first threshold is unequal to the second threshold.

In one subembodiment, N is a maximum value between the first threshold and the second threshold.

In one embodiment, there is one information element among the N1 information elements and the N2 information elements that comprises a third-type index, the third-type index being a non-negative integer.

In one subembodiment, when the operating action is receiving and the first information element comprises a third-type index, the third-type index comprised by the first information element is used to determine an antenna for receiving the first signal.

In one subembodiment, when the operating action is transmitting and the first information element comprises a third-type index, the third-type index comprised by the first information element is used to determine an antenna for transmitting the first signal.

In one subembodiment, when the operating action is transmitting and the first information element comprises a third-type index, the third-type index comprised by the first information element is used to determine a Timing advance (TA) for the first signal.

In one subembodiment, when the operating action is transmitting and the first information element comprises a third-type index, the third-type index comprised by the first information element is used to determine a power control parameter of the first signal.

In one embodiment, the Rx parameters comprise large-scale properties of a channel over which the first signal is conveyed.

In one embodiment, the Rx parameters comprise one or more of delay spread, Doppler spread, Doppler shift, average gain, average delay or Spatial Rx parameters of a channel over which the first signal is conveyed.

In one embodiment, the Rx parameters comprise a spatial domain receive filter.

In one embodiment, the Rx parameters comprise a spatial domain filter.

In one embodiment, the Rx parameters comprise Quasi co-location (QCL) assumption.

In one embodiment, the Rx parameters comprise a QCL parameter.

In one embodiment, the above phrase that a second-type index set comprised by the first information element is used to determine Rx parameters of the first signal means that large-scale properties of a channel experienced by the first signal can be inferred from large-scale properties of a channel experienced by a reference signal transmitted in a reference signal resource indicated by a second-type index set comprised by the first information element.

In one embodiment, the above phrase that a second-type index set comprised by the first information element is used to determine Rx parameters of the first signal means that the first node receives the first signal employing a same spatial domain filter as that employed when receiving a reference signal in a reference signal resource indicated by a second-type index comprised by the first information element.

In one embodiment, the above phrase that a second-type index set comprised by the first information element is used to determine Rx parameters of the first signal means that the first node receives the first signal employing a same spatial domain filter as that employed when transmitting a reference signal in a reference signal resource indicated by a second-type index comprised by the first information element.

In one embodiment, the above phrase that a second-type index set comprised by the first information element is used to determine Rx parameters of the first signal means that the first node receives the first signal employing a same antenna as that employed when receiving or transmitting a reference signal in a reference signal resource indicated by a second-type index comprised by the first information element.

In one embodiment, the Tx parameters comprise a spatial domain transmission filter.

In one embodiment, the Tx parameters comprise a spatial domain filter.

In one embodiment, the Tx parameters comprise a transmission antenna.

In one embodiment, the Tx parameters comprise a precoding matrix.

In one embodiment, the Tx parameters comprise a precoding vector.

In one embodiment, the Tx parameters comprise a TA.

In one embodiment, the Tx parameters comprise a power control parameter.

In one embodiment, the Tx parameters comprise QCL assumption.

In one embodiment, the Tx parameters comprise a QCL parameter.

In one embodiment, the above phrase that a second-type index set comprised by the first information element is used to determine Tx parameters of the first signal means that the first node transmits the first signal employing a same spatial domain filter as that employed when transmitting a reference signal in a reference signal resource indicated by a second-type index comprised by the first information element.

In one embodiment, the above phrase that a second-type index set comprised by the first information element is used to determine Tx parameters of the first signal means that the first node transmits the first signal employing a same spatial domain filter as that employed when receiving a reference signal in a reference signal resource indicated by a second-type index comprised by the first information element.

In one embodiment, the above phrase that a second-type index set comprised by the first information element is used to determine Tx parameters of the first signal means that the first node transmits the first signal employing a same precoding matrix filter as that employed when transmitting a reference signal in a reference signal resource indicated by a second-type index comprised by the first information element.

In one embodiment, the above phrase that a second-type index set comprised by the first information element is used to determine Tx parameters of the first signal means that the first node transmits the first signal employing a same antenna as that employed when receiving or transmitting a reference signal in a reference signal resource indicated by a second-type index comprised by the first information element.

In one embodiment, the M first-type indexes respectively indicate M reference signal resources; a reference signal resource indicated by a second-type index comprised by any one of the M1 information elements is associated with a reference signal resource of the M reference signal resources; a reference signal resource indicated by a second-type index comprised by any one of the M2 information elements is associated with a reference signal resource of the M reference signal resources.

In one subembodiment, the M reference signal resources comprise a CSI-RS resource.

In one subembodiment, the M reference signal resources comprise an SRS resource.

In one subembodiment, the M reference signal resources comprise an SSB resource.

In one subembodiment, the phrase that two reference signal resources are associated means that reference signals respectively transmitted in the two reference signal resources are associated.

Embodiment 2

Figure 2:
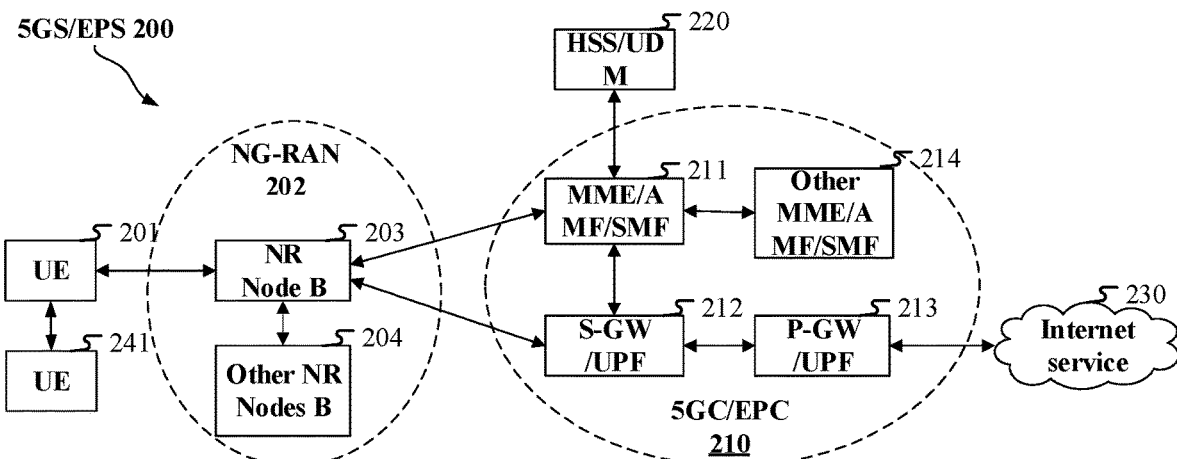
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), and Long-Term Evolution Advanced (LTE-A) and future 5G systems. The network architecture 200 of LTE, LTE-A, and NR 5G may be called an Evolved Packet System (EPS) 200. 5G NR or LTE network architecture 200 can be called 5G System (5GS)/Evolved Packet System (EPS) 200 or other appliable terms. The 5GS/EPS 200 may comprise one or more UEs 201, a UE 241 in sidelink communication with the UE 201, an NG-RAN 202, a 5G-Core Network/Evolved Packet Core (5G-CN/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) services.

In one embodiment, the first node in the present disclosure comprises the UE 201.

In one embodiment, the first node in the present disclosure comprises the UE 241.

In one embodiment, the second node in the present disclosure comprises the gNB 203.

In one embodiment, the second node in the present disclosure comprises the UE 241.

In one embodiment, a radio link between the UE 201 and the gNB 203 is a cellular link.

In one embodiment, a radio link between the UE 201 and the UE 241 is a Sidelink.

In one embodiment, a transmitter of the first information block in the present disclosure comprises the gNB 203.

In one embodiment, a receiver of the first information block in the present disclosure comprises the UE 201.

In one embodiment, a transmitter of the first signaling in the present disclosure comprises the gNB 203.

In one embodiment, a receiver of the first signaling in the present disclosure comprises the UE 241.

In one embodiment, a transmitter of the first signal in the present disclosure comprises the gNB 203.

In one embodiment, a receiver of the first signal in the present disclosure comprises the UE 241.

In one embodiment, a transmitter of the first signal in the present disclosure comprises the UE 241.

In one embodiment, a receiver of the first signal in the present disclosure comprises the gNB 203.

Embodiment 3

Figure 3:
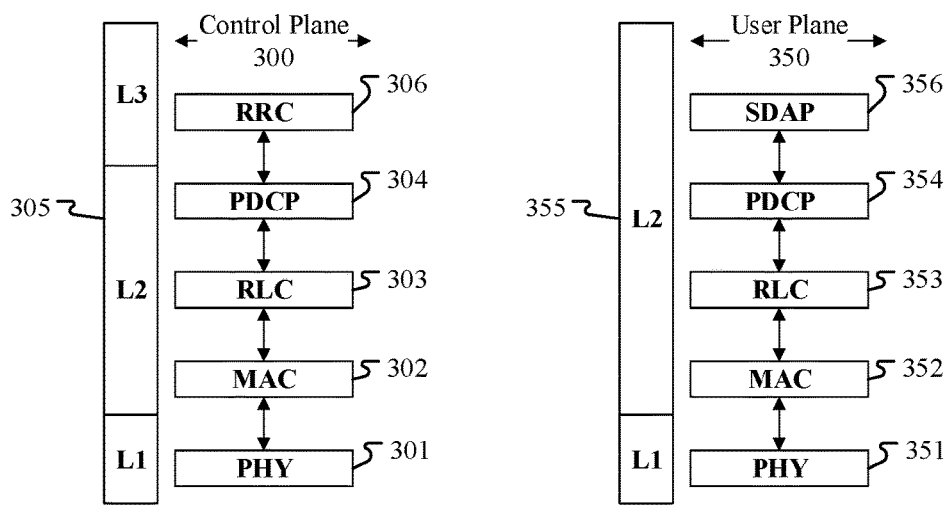
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

Embodiment 3 illustrates a schematic diagram illustrating a radio protocol architecture of a user plane and a control plane, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 305, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block is generated by the MAC sublayer 302, or by the MAC sublayer 352.

In one embodiment, the first signaling is generated by the PHY 301, or by the PHY 351.

In one embodiment, the first signaling is generated by the MAC sublayer 302, or by the MAC sublayer 352.

In one embodiment, the first signal is generated by the PHY 301, or by the PHY 351.

In one embodiment, the second information block is generated by the RRC sublayer 306.

In one embodiment, the first-type reference signal is generated by the PHY 301, or by the PHY 351.

In one embodiment, the third information block is generated by the RRC sublayer 306.

Embodiment 4

Figure 4:
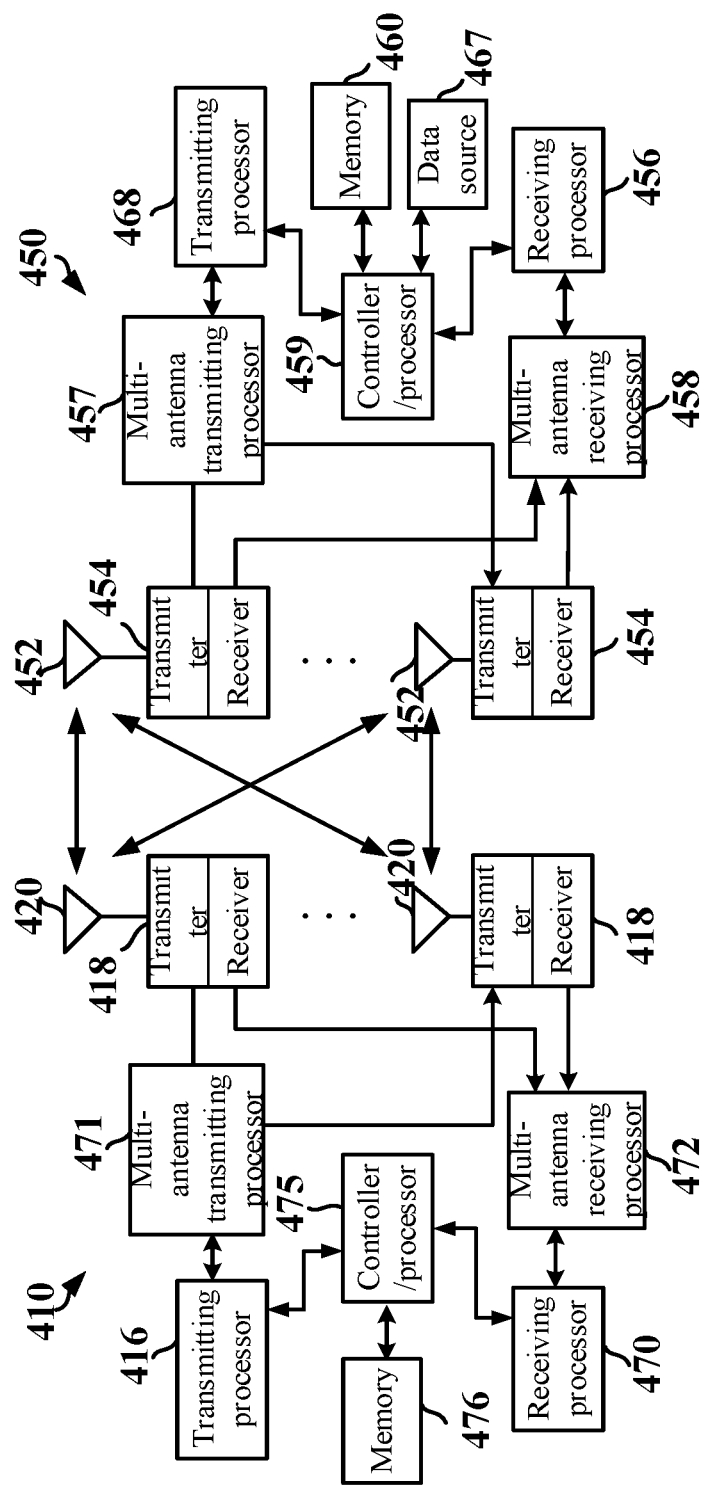
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In DL, the controller/processor 475 provides header compression, encryption, packet segmentation and reordering, and multiplexing between a logical channel and a transport channel, and radio resource allocation of the second communication device 450 based on various priorities. The controller/processor 475 is also in charge of HARQ operation, a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and constellation mapping according to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multi-carrier symbol stream to be provided to the receiving processor 456. The receiving processor 456 and the multi-antenna receiving processor 458 perform signal processing functions of the L1 layer. The multi-antenna receiving processor 458 performs reception analog precoding/beam-forming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing. The controller/processor 459 is also in charge of error detection employing ACK and/or NACK protocols so as to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multi-plexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network. The controller/processor 475 is also in charge of error detection employing ACK and/or NACK protocols so as to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first information block in the present disclosure; receives the first signaling in the present disclosure; and operates the first signal in the present disclosure. The first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the operating action is receiving or transmitting; when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal.

In one embodiment, the second communication device 450 comprises a memory that stores computer readable instruction program, the computer readable instruction program generates actions when executed by at least one processor, which include: receiving the first information block in the present disclosure; receiving the first signaling in the present disclosure; and operating the first signal in the present disclosure. The first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the operating action is receiving or transmitting; when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first information block in the present disclosure; transmits the first signaling in the present disclosure; and processes the first signal in the present disclosure; the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the processing action is transmitting or receiving; when the processing action is transmitting, the first signaling indicates the first information element out of the M1 information elements, and a second-type index set comprised by the first information element is used to determine Rx parameters of the first signal; when the processing action is receiving, the first signaling indicates the first information element out of the M2 information elements, and a second-type index set comprised by the first information element is used to determine Tx parameters of the first signal.

In one embodiment, the first communication device 410 comprises a memory that stores computer readable instruction program, the computer readable instruction program generates actions when executed by at least one processor, which include: transmitting the first information block in the present disclosure; transmitting the first signaling in the present disclosure; and processing the first signal in the present disclosure; the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the processing action is transmitting or receiving; when the processing action is transmitting, the first signaling indicates the first information element out of the M1 information elements, and a second-type index set comprised by the first information element is used to determine Rx parameters of the first signal; when the processing action is receiving, the first signaling indicates the first information element out of the M2 information elements, and a second-type index set comprised by the first information element is used to determine Tx parameters of the first signal.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first information block in the present disclosure; at least one of the antenna 420, the transmitter 418, the transmitting processor 416, the multi-antenna transmitting processor 471, the controller/processor 475 or the memory 476 is used to transmit the first information block in the present disclosure.

In one embodiment, at least one of the antenna 452, the receiver 454, the receiving processor 456, the multi-antenna receiving processor 458, the controller/processor 459, the memory 460 or the data source 467 is used to receive the first signaling in the present disclosure; at least one of the antenna 420, the transmitter 418, the transmitting processor 416, the multi-antenna transmitting processor 471, the controller/processor 475 or the memory 476 is used to transmit the first signaling in the present disclosure.

In one embodiment, at least one of the antenna 452, the receiver 454, the receiving processor 456, the multi-antenna receiving processor 458, the controller/processor 459, the memory 460 or the data source 467 is used to receive the first signal in the present disclosure; at least one of the antenna 420, the transmitter 418, the transmitting processor 416, the multi-antenna transmitting processor 471, the controller/ processor 475 or the memory 476 is used to transmit the first signal in the present disclosure.

In one embodiment, at least one of the antenna 420, the receiver 418, the receiving processor 470, the multi-antenna receiving processor 472, the controller/processor 475 or the memory 476 is used to receive the first signal in the present disclosure; at least one of the antenna 452, the transmitter 454, the transmitting processor 468, the multi-antenna transmitting processor 457, the controller/processor 459, the memory 460 or the data source 467 is used to transmit the first signal in the present disclosure.

In one embodiment, at least one of the antenna 452, the receiver 454, the receiving processor 456, the multi-antenna receiving processor 458, the controller/processor 459, the memory 460 or the data source 467 is used to receive the second information block in the present disclosure; at least one of the antenna 420, the transmitter 418, the transmitting processor 416, the multi-antenna transmitting processor 471, the controller/processor 475 or the memory 476 is used to transmit the second information block in the present disclosure.

In one embodiment, at least one of the antenna 452, the receiver 454, the receiving processor 456, the multi-antenna receiving processor 458, the controller/processor 459, the memory 460 or the data source 467 is used to receive the first-type reference signal in the present disclosure; at least one of the antenna 420, the transmitter 418, the transmitting processor 416, the multi-antenna transmitting processor 471, the controller/processor 475 or the memory 476 is used to transmit the first-type reference signal in the present disclosure.

In one embodiment, at least one of the antenna 420, the receiver 418, the receiving processor 470, the multi-antenna receiving processor 472, the controller/processor 475 or the memory 476 is used to receive the first-type reference signal in the present disclosure; at least one of the antenna 452, the transmitter 454, the transmitting processor 468, the multi-antenna transmitting processor 457, the controller/processor 459, the memory 460 or the data source 467 is used to transmit the first-type reference signal in the present disclosure.

In one embodiment, at least one of the antenna 452, the receiver 454, the receiving processor 456, the multi-antenna receiving processor 458, the controller/processor 459, the memory 460 or the data source 467 is used to receive the third information block in the present disclosure; at least one of the antenna 420, the transmitter 418, the transmitting processor 416, the multi-antenna transmitting processor 471, the controller/processor 475 or the memory 476 is used to transmit the third information block in the present disclosure.

Embodiment 5

Figure 5:
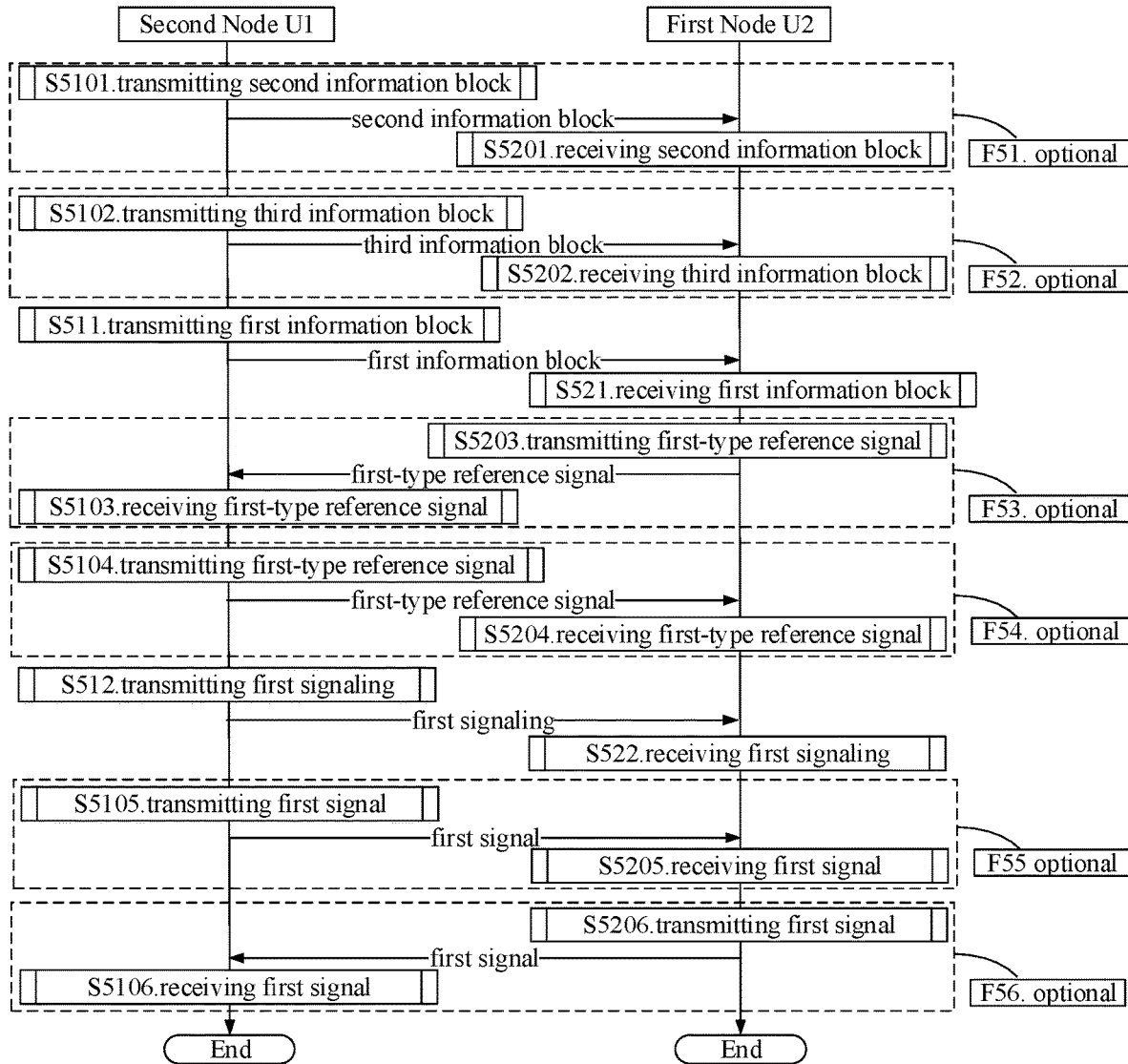
FIG. 5 illustrates a flowchart of wireless transmission according to one embodiment of the present disclosure.

Embodiment 5 illustrates a flowchart of wireless transmission according to one embodiment of the present disclosure, as shown in FIG. 5. In FIG. 5, a second node U1 and a first node U2 are communication nodes that transmit via an air interface. In FIG. 5, steps respectively illustrated by boxes F51-F56 are optional, respectively; steps marked by only one of the boxes F55 and F56 exist, and steps marked by the box F53 and the box F54 cannot coexist.

The second node U1 transmits a second information block in step S5101; transmits a third information block in step S5102; and transmits a first information block in step S511; receives a first-type reference signal in step S5103; transmits the first-type reference signal in step S5104; and transmits a first signaling in step S512; transmits a first signal in step S5105; and receives the first signal in step S5106.

The first node U2 receives a second information block in step S5201; receives a third information block in step S5202; and receives a first information block in step S521; transmits a first-type reference signal in step S5203; and receives the first-type reference signal in step S5204; receives a first signaling in step S522; receives a first signal in step S5205; and transmits the first signal in step S5206.

In Embodiment 5, the first information block is used by the first node U2 to determine M first-type indexes out of N first-type indexes, M being a positive integer greater than 1, and N being a positive integer no less than M; the M first-type indexes are used by the first node U2 to determine M1 information elements out of N1 information elements, and the M first-type indexes are used by the first node U2 to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; when steps marked by the box F55 in FIG. 5 exist, while steps marked by the box F56 in FIG. 5 do not exist, the first signaling indicates the first information element out of the M2 information elements, and a second-type index set comprised by the first information element is used by the first node U2 to determine Tx parameters of the first signal.

In one embodiment, the first node U2 is the first node in the present disclosure.

In one embodiment, the second node U1 is the second node in the present disclosure.

In one embodiment, an air interface between the second node U1 and a first node U2 comprises a wireless interface between a base station and a UE.

In one embodiment, an air interface between the second node U1 and a first node U2 comprises a wireless interface between a UE and a UE.

In one embodiment, steps marked by the box F55 in FIG. 5 exist, while steps marked by the box F56 in FIG. 5 do not exist.

In one embodiment, the operating action in the present disclosure is receiving, and the processing action in the present disclosure is transmitting.

In one embodiment, the processing action in the present disclosure is transmitting, the first signaling indicates the first information element out of the M1 information elements, and a second-type index set comprised by the first information element is used by the first node to determine Rx parameters of the first signal.

In one embodiment, steps marked by the box F55 in FIG. 5 do not exist, while steps marked by the box F56 in FIG. 5 exist.

In one embodiment, the operating action in the present disclosure is transmitting, and the processing action in the present disclosure is receiving.

In one embodiment, the processing action in the present disclosure is receiving, the first signaling indicates the first information element out of the M2 information elements, and a second-type index set comprised by the first information element is used by the first node to determine Tx parameters of the first signal.

In one embodiment, steps marked by the box F51 in FIG. 5 exist; the second information block is used by the first node U2 to determine Q sub-bands, Q being a positive integer greater than 1; the first signal belongs to one of the Q sub-bands in frequency domain.

In one embodiment, steps marked by the box F51 in FIG. 5 do not exist.

In one embodiment, steps marked by the box F52 in FIG. 5 exist; the third information block is used by the first node U2 to determine the N1 information elements and the N2 information elements.

In one embodiment, steps marked by the box F52 in FIG. 5 do not exist.

In one embodiment, steps marked by the box F53 in FIG. 5 exist, while steps marked by the box F54 in FIG. 5 do not exist.

In one embodiment, the first node transmits the first-type reference signal.

In one embodiment, the second node receives the first-type reference signal.

In one embodiment, steps marked by the box F53 in FIG. 5 do not exist, while steps marked by the box F54 in FIG. 5 exist.

In one embodiment, the first node receives the first-type reference signal.

In one embodiment, the second node transmits the first-type reference signal.

In one embodiment, the first-type reference signal is transmitted in a first-type reference signal resource, and a second-type index set comprised by the first information element indicates the first-type reference signal resource; when the operating action is receiving, the first-type reference signal is used by the first node U2 to determine large-scale properties of a wireless channel over which the first signal is conveyed; when the operating action is transmitting, the first-type reference signal is used by the first node U2 to determine the Tx parameters of the first signal.

In one embodiment, none of steps marked by the box F53 and the box F54 exists.

In one embodiment, the first information block is transmitted on a downlink physical layer data channel (i.e., a downlink channel capable of carrying physical layer data).

In one embodiment, the first information block is transmitted on a PDSCH.

In one embodiment, the first information block is transmitted on a Physical Sidelink Shared Channel (PSSCH).

In one embodiment, the first signaling is transmitted on a downlink physical layer control channel (i.e., a downlink channel only capable of carrying a physical layer signaling).

In one embodiment, the first signaling is transmitted on a Physical Downlink Control Channel (PDCCH).

In one embodiment, the first signaling is transmitted on a Physical Sidelink Control Channel (PSCCH).

In one embodiment, the first signal is transmitted on a downlink physical layer data channel (i.e., a downlink channel capable of carrying physical layer data).

In one embodiment, the first signal is transmitted on a PDSCH.

In one embodiment, the first signal is transmitted on an uplink physical layer data channel (i.e., an uplink channel capable of carrying physical layer data).

In one embodiment, the first signal is transmitted on a PUSCH.

In one embodiment, the first signal is transmitted on a PSSCH.

In one embodiment, the second information block is transmitted on a downlink physical layer data channel (i.e., a downlink channel capable of carrying physical layer data).

In one embodiment, the second information block is transmitted on a PDSCH.

In one embodiment, the second information block is transmitted on a PSSCH.

In one embodiment, the third information block is transmitted on a downlink physical layer data channel (i.e., a downlink channel capable of carrying physical layer data).

In one embodiment, the third information block is transmitted on a PDSCH.

In one embodiment, the third information block is transmitted on a PSSCH.

Embodiment 6

Figure 6:
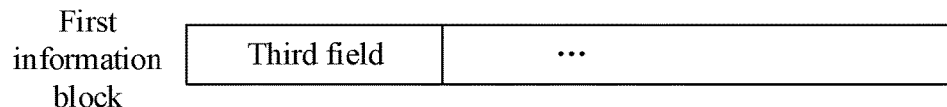
FIG. 6 illustrates a schematic diagram of a first information block according to one embodiment of the present disclosure.

Embodiment 6 illustrates a schematic diagram of a first information block according to one embodiment of the present disclosure; as shown in FIG. 6. In Embodiment 6, the first information block comprises a third field, and the third field of the first information block indicates N first-type values, the N first-type values respectively corresponding to the N first-type indexes; for any given first-type value of the N first-type values, when the given first-type value belongs to a first value set, a first-type index of the N first-type indexes that corresponds to the given first-type value belongs to the M first-type indexes; when the given first-type value belongs to a second value set, a first-type index of the N first-type indexes that corresponds to the given first-type value does not belong to the M first-type indexes; there does not exist a value shared by the first value set and the second value set.

In one embodiment, the first information block comprises a positive integer number of information bit(s).

In one embodiment, the first information block comprises a first field, and the first field of the first information block indicates a serving cell IDentity (ID).

In one subembodiment of the above embodiment, the first field of the first information block comprises 5 bits.

In one embodiment, the first information block comprises a second field, and the second field of the first information block indicates a BandWidth Part (BWP) ID.

In one subembodiment of the above embodiment, the second field of the first information block comprises 2 bits.

In one embodiment, the N first-type values are respectively N bit values, the first value set consists of first bit values, and the second value set consists of second bit values.

In one subembodiment of the above embodiment, the first bit value is equal to 1, while the second bit value is equal to 0.

In one subembodiment of the above embodiment, the first bit value is equal to 0, while the second bit value is equal to 1.

In one embodiment, the first value set comprises S1 values, S1 being a positive integer greater than 1.

In one subembodiment of the above embodiment, the S1 values are respectively S1 non-negative integers.

In one subembodiment of the above embodiment, the S1 is equal to 8.

In one embodiment, any two of the M first-type indexes corresponding to equal first-type values correspond to a same TCI codepoint.

In one embodiment, for any given first-type index of the M first-type indexes, a TCI codepoint corresponding to the given first-type index is equal to one of the N first-type values corresponding to the given first-type index.

In one embodiment, the second value set comprises only one value.

In one embodiment, the first signaling indicates one of the N first-type values corresponding to a first-type index comprised by the first information element.

Embodiment 7

Figure 7:
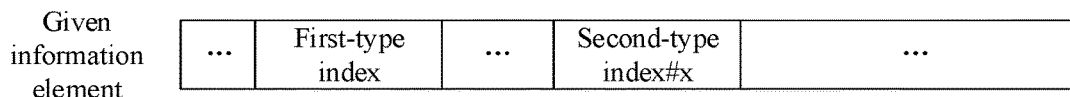
FIG. 7 illustrates a schematic diagram of a given information element according to one embodiment of the present disclosure.

Embodiment 7 illustrates a schematic diagram of a given information element according to one embodiment of the present disclosure; as shown in FIG. 7. The given information element in Embodiment 7 is any information element of the N1 information elements and the N2 information elements. The given information element comprises a first-type index and a second-type index set, and each second-type index set comprises one or more second-type indexes, of which each second-type index indicates a reference signal resource. In FIG. 7, the second-type index #x represents a (x+1)-th second-type index in a second-type index set comprised by the given information element, x being any non-negative integer less than a number of second-type index(es) in a second-type index set comprised by the given information element.

In one embodiment, the given information element is any one of the N1 information elements.

In one embodiment, the given information element is any one of the N2 information elements.

In one embodiment, a first-type index comprised by any information element of the N1 information elements and the N2 information elements is a non-negative integer.

In one embodiment, a first-type index comprised by any information element of the N1 information elements and the N2 information elements is a non-negative integer less than the N.

In one embodiment, a first-type index comprised by any information element of the N1 information elements and the N2 information elements is a TCI-StateId.

In one embodiment, a first-type index comprised by any information element of the N1 information elements and the N2 information elements is one of the N first-type indexes.

In one embodiment, any second-type index comprised by any information element of the N1 information elements and the N2 information elements is a non-negative integer.

In one embodiment, there is an information element among the N1 information elements and the N2 information elements that comprises a second-type index set comprising only one second-type index.

In one embodiment, there is an information element among the N1 information elements and the N2 information elements that comprises a second-type index set comprising multiple second-type indexes.

In one embodiment, any second-type index comprised by any information element of the N1 information elements and the N2 information elements indicates an ID of a reference signal resource.

In one embodiment, any second-type index comprised by any information element of the N1 information elements and the N2 information elements is one of an NZP-CSI-RS-ResourceId, an NZP-CSI-RS-ResourceSetId, an SSB-Index, an SRS-ResourceSetId, an SRS-ResourceId or a panel Id.

In one embodiment, a reference signal resource indicated by any second-type index comprised by any information element of the N1 information elements and the N2 information elements is one of a Channel State Information Reference Signal (CSI-RS) resource, a CSI-RS resource set, a Sounding Reference Signal (SRS) resource, an SRS resource set or a Synchronisation Signal/physical broadcast channel Block (SSB) resource.

In one embodiment, there is an information element among the N1 information elements and the N2 information elements that comprises a second-type index by which a reference signal resource indicated comprises a CSI-RS resource.

In one embodiment, there is an information element among the N1 information elements and the N2 information elements that comprises a second-type index by which a reference signal resource indicated comprises a CSI-RS resource set.

In one embodiment, there is an information element among the N1 information elements and the N2 information elements that comprises a second-type index by which a reference signal resource indicated comprises an SRS resource.

In one embodiment, there is an information element among the N1 information elements and the N2 information elements that comprises a second-type index by which a reference signal resource indicated comprises an SRS resource set.

In one embodiment, there is an information element among the N1 information elements and the N2 information elements that comprises a second-type index by which a reference signal resource indicated comprises an SSB resource.

In one embodiment, when the first information element comprises 2 second-type indexes and the 2 second-type indexes respectively indicate a first downlink reference signal and a second uplink reference signal, the first node employs a same spatial domain filter to receive the first downlink reference signal and transmit the second uplink reference signal.

In one embodiment, when the first information element comprises 2 second-type indexes and the 2 second-type indexes respectively indicate a first downlink reference signal and a second uplink reference signal, only when the first node employs a same spatial domain filter to receive the first downlink reference signal and transmit the second uplink reference signal can the second uplink reference signal be used to determine the Tx parameters of the first signal.

In one embodiment, the first downlink reference signal comprises a CSI-RS.

In one embodiment, the first downlink reference signal comprises an SSB.

In one embodiment, the second uplink reference signal comprises an SRS.

In one embodiment, when the operating action is transmitting, and the first information element comprises 2 second-type indexes, there is a second-type index in the two second-type indexes indicating an uplink reference signal resource.

In one embodiment, the uplink reference signal resource comprises an SRS resource.

In one embodiment, the uplink reference signal resource comprises an SRS resource set.

Embodiment 8

Embodiment 8 illustrates a schematic diagram of a given information element according to one embodiment of the present disclosure; as shown in FIG. 8. The given information element in Embodiment 8 is any information element of the N1 information elements and the N2 information elements. The given information element indicates a related type corresponding to each second-type index comprised; when the given information element comprises multiple second-type indexes, the related types respectively corresponding to the multiple second-type indexes are mutually different.

In one embodiment, any information element of the N1 information elements and the N2 information elements indicates a related type corresponding to each second-type index comprised; for any given information element of the N1 information elements and the N2 information elements, when the given information element comprises multiple second-type indexes, the related types respectively corresponding to the multiple second-type indexes are mutually different.

In one embodiment, a related type corresponding to any second-type index comprised by any one of the N1 information elements and the N2 information elements belongs to a first related type set; the first related type set comprises QCL-TypeA, QCL-TypeB, QCL-TypeC and QCL-TypeD.

In one embodiment, the related type comprises QCL type.

In one embodiment, for the detailed definition of QCL type, refer to 3GPP TS38.214.

In one embodiment, for detailed definition of QCL-TypeA, QCL-TypeB, QCL-TypeC and QCL-TypeD, refer to 3GPP TS38.214.

In one embodiment, the first information element indicates a related type corresponding to each second-type index comprised; when the operating action is receiving, a second-type index set comprised by the first information element and related types respectively corresponding to each of second-type indexes comprised by the first information element are jointly used to determine the Rx parameters of the first signal; when the operating action is transmitting, a second-type index set comprised by the first information element and related types respectively corresponding to each of second-type indexes comprised by the first information element are jointly used to determine the Tx parameters of the first signal.

In one embodiment, the operating action is receiving, the first information element comprises W1 second-type indexes, W1 being a positive integer greater than 1, and only some of the W1 second-type indexes are used to determine the Rx parameters of the first signal.

In one embodiment, when the operating action is receiving, the first information element comprises W1 second-type indexes and W1 is a positive integer greater than 1, in the W1 second-type indexes only second-type indexes whose corresponding related types belong to a first related type subset are used to determine the Rx parameters of the first signal.

In one subembodiment, the first related type subset comprises QCL-TypeA and QCL-TypeD.

In one subembodiment, the Rx parameters of the first signal are unrelated to any second-type index out of the W1 second-type indexes whose corresponding related type does not belong to the first related type subset.

In one embodiment, the operating action is transmitting, the first information element comprises W2 second-type indexes, W2 being a positive integer greater than 1, and only some of the W2 second-type indexes are used to determine the Tx parameters of the first signal.

In one embodiment, when the operating action is transmitting, the first information element comprises W2 second-type indexes and W2 is a positive integer greater than 1, in the W2 second-type indexes only second-type indexes whose corresponding related types belong to a second related type subset are used to determine the Tx parameters of the first signal.

In one subembodiment, the second related type subset comprises only some QCL types among QCL-TypeA, QCL-TypeB, QCL-TypeC and QCL-TypeD.

In one subembodiment, the second related type subset comprises QCL-TypeD.

In one subembodiment, the second related type subset comprises only the QCL-TypeD among QCL-TypeA, QCL-TypeB, QCL-TypeC and QCL-TypeD.

In one subembodiment, the Tx parameters of the first signal are unrelated to any second-type index of the W1 second-type indexes to which a related type corresponds does not belong to the second related type subset.

Embodiment 9

Embodiment 9 illustrates a schematic diagram of M first-type indexes being used to determine M1 information elements and M2 information elements according to one embodiment of the present disclosure; as shown in FIG. 9. In Embodiment 9, a first-type index comprised by any information element of the M1 information elements is one of the M first-type indexes, while a first-type index comprised by any information element of the M2 information elements is one of the M first-type indexes.

In one embodiment, the M1 information elements are composed of all information elements of the N1 information elements of which each comprises a first-type index being one of the M first-type indexes.

In one embodiment, the M2 information elements are composed of all information elements out of the N2 information elements of which each comprises a first-type index being one of the M first-type indexes.

In one embodiment, the M1 information elements are composed of all information elements out of the N1 information elements of which each comprises a first-type index being one of the M first-type indexes; the M1 information elements are used to determine the M2 information elements out of the N2 information elements.

In one subembodiment, a reference signal indicated by a second-type index comprised by any of the M2 information elements is associated with a reference signal indicated by a second-type index comprised by one of the M1 information elements.

In one embodiment, the M2 information elements are composed of all information elements out of the N2 information elements of which each comprises a first-type index being one of the M first-type indexes; the M2 information elements are used to determine the M1 information elements out of the N1 information elements.

In one subembodiment, a reference signal indicated by a second-type index comprised by any of the M1 information elements is associated with a reference signal indicated by a second-type index comprised by one of the M2 information elements.

In one embodiment, in the M1 information elements there is an information element comprising a first-type index equal to a first-type index comprised by an information element of the M2 information elements.

In one embodiment, in the M1 information elements there is an information element comprising a first-type index unequal to a first-type index comprised by any information element of the M2 information elements.

In one embodiment, in the M2 information elements there is an information element comprising a first-type index unequal to a first-type index comprised by any information element of the M1 information elements.

In one embodiment, M3 is a smaller value between M1 and M2, a first-type index comprised by an x-th information element of the M1 information elements is equal to a first-type index comprised by an x-th information element of the M2 information elements; x is a positive integer no greater than M3.

Embodiment 10

Embodiment 10 illustrates a schematic diagram of a third information element and a fourth information element according to one embodiment of the present disclosure; as shown in FIG. 10. In Embodiment 10, the third information element is one of the M1 information elements, while the fourth information element is one of the M2 information elements; a first-type index comprised by the fourth information element is equal to a first-type index comprised by the third information element, and a reference signal indicated by a second-type index comprised by the third information element is associated with a reference signal indicated by a second-type index comprised by the fourth information element.

In one embodiment, if in the M2 information elements there is the fourth information element comprising a first-type index equal to a first-type index comprised by the third information element, a reference signal indicated by a second-type index comprised by the third information element is associated with a reference signal indicated by a second-type index comprised by the fourth information element.

In one embodiment, a reference signal indicated by any given second-type index comprised by an information element refers to a reference signal transmitted in a reference signal resource indicated by the given second-type index.

In one embodiment, the phrase that two reference signals are associated means that the two reference signals are QCL.

In one embodiment, the phrase that two reference signals are associated means that an antenna port for transmitting one of the two reference signals is QCL with an antenna port for transmitting the other of the two reference signals.

In one embodiment, the phrase that two reference signals are associated means that any antenna port for transmitting one of the two reference signals is QCL with an antenna port for transmitting the other of the two reference signals.

In one embodiment, the phrase that two reference signals are associated means that any antenna port for transmitting one of the two reference signals is QCL with any antenna port for transmitting the other of the two reference signals.

In one embodiment, the phrase that two reference signals are associated means that a same spatial domain filter is used to receive the two reference signals.

In one embodiment, the phrase that two reference signals are associated means that a same spatial domain filter is used to transmit the two reference signals.

In one embodiment, the phrase that two reference signals are associated means that a same spatial domain filter is used to receive one of the two reference signals and transmit the other of the two reference signals.

In one embodiment, a first reference signal is a reference signal indicated by a second-type index comprised by the third information element, and the third information element indicates that a related type corresponding to the first reference signal is a second related type; a second reference signal is a reference signal indicated by a second-type index comprised by the fourth information element, and the fourth information element indicates that a related type corresponding to the second reference signal is the second related type; the first reference signal and the second reference signal are associated.

In one subembodiment of the above embodiment, the second related type is QCL-TypeD.

Embodiment 11

Embodiment 11 illustrates a schematic diagram of a second information block according to one embodiment of the present disclosure; as shown in FIG. 11. In Embodiment 11, the second information block is used to determine the Q sub-bands, and the first signal belongs to one of the Q sub-bands in frequency domain.

In one embodiment, the second information block is carried by a higher layer signaling.

In one embodiment, the second information block is carried by an RRC signaling.

In one embodiment, the second information block is carried by a MAC CE signaling.

In one embodiment, the second information block is transmitted in SideLink.

In one embodiment, the second information block is transmitted in downlink link.

In one embodiment, the second information block comprises a positive integer number of information bit(s).

In one embodiment, the second information block comprises information in all or part of fields of an IE.

In one embodiment, the second information block indicates the Q sub-bands.

In one embodiment, the second information block explicitly indicates the Q sub-bands.

In one embodiment, the second information block implicitly indicates the Q sub-bands.

In one embodiment, a sub-band of the Q sub-bands comprises a carrier.

In one embodiment, a sub-band of the Q sub-bands comprises a BWP.

In one embodiment, any of the Q sub-bands comprises a carrier.

In one embodiment, any of the Q sub-bands comprises a BWP.

In one embodiment, in the Q sub-bands there is one sub-band comprising multiple BWPs in a carrier.

In one embodiment, in the Q sub-bands there are two sub-bands belonging to a same carrier.

In one embodiment, in the Q sub-bands there are two sub-bands respectively comprising different BWPs in a same carrier.

In one embodiment, in the Q sub-bands there are two sub-bands belonging to different carriers.

In one embodiment, in the Q sub-bands there are two sub-bands respectively comprising different BWPs in different carriers.

In one embodiment, any sub-band of the Q sub-bands is a consecutive frequency-domain interval.

In one embodiment, any sub-band of the Q sub-bands comprises a positive integer number of consecutive subcarriers in frequency domain.

In one embodiment, any sub-band of the Q sub-bands comprises a positive integer number of consecutive Resource Blocks (RBs) in frequency domain.

In one embodiment, any two sub-bands of the Q sub-bands are orthogonal (that is, non-overlapping) in frequency domain.

In one embodiment, the Q sub-bands are consecutive in frequency domain.

In one embodiment, there is a Guard Period between two adjacent sub-bands of the Q sub-bands in frequency domain.

In one embodiment, there is a Guard Period between any two adjacent sub-bands of the Q sub-bands in frequency domain.

In one embodiment, the first signal only occupies frequency-domain resources within one of the Q sub-bands.

Embodiment 12

Embodiment 12 illustrates a schematic diagram of a first signaling being used to determine a first parameter group according to one embodiment of the present disclosure; as shown in FIG. 12. In Embodiment 12, the operating action is transmitting.

In one embodiment, when the operating action is transmitting, the first signaling is used by the first node to determine the first parameter group; the first parameter group is used by the first node to determine the first reference power, and the first reference power is used by the first node to determine a transmitting power of the first signal.

In one embodiment, the phrase that the first signaling is used to determine a first parameter group comprises: the first signaling indicates a TCI codepoint corresponding to the first information element, and the first parameter group corresponds to the TCI codepoint corresponding to the first information element.

In one embodiment, the phrase that the first signaling is used to determine a first parameter group comprises: the first signaling indicates the first information element, and the first parameter group corresponds to a first-type index comprised by the first information element.

In one embodiment, the phrase that the first signaling is used to determine a first parameter group comprises: the first signaling indicates the first information element, and the first parameter group corresponds to a reference signal resource indicated by a second-type index comprised by the first information element.

In one embodiment, the phrase that the first signaling is used to determine a first parameter group comprises: the first signaling indicates the first parameter group.

In one embodiment, the method in a first node for wireless communications comprises:
receiving a fourth information block;
herein, the fourth information block indicates a first-type index comprised by the first information element and the first parameter group.

In one subembodiment, the fourth information block is carried by a higher layer signaling.

In one subembodiment, the fourth information block is carried by an RRC signaling.

In one subembodiment, the fourth information block comprises information in all or part of fields of an IE.

In one subembodiment, the fourth information block indicates that a first-type index comprised by the first information element corresponds to the first parameter group.

In one subembodiment, the fourth information block and the third information block are carried by a same RRC signaling.

In one subembodiment, the fourth information block and the third information block are carried by different RRC signalings.

In one subembodiment, the fourth information block is transmitted on a PDSCH.

In one embodiment, the method in a first node for wireless communications comprises:
receiving a fifth information block;
herein, the fifth information block indicates a TCI codepoint corresponding to the first information element and the first parameter group.

In one subembodiment, the fifth information block is carried by a higher layer signaling.

In one subembodiment, the fifth information block is carried by an RRC signaling.

In one subembodiment, the fifth information block comprises information in all or part of fields of an IE.

In one subembodiment, the fifth information block indicates that a TCI codepoint corresponding to the first information element corresponds to the first parameter group.

In one subembodiment, the fifth information block and the third information block are carried by a same RRC signaling.

In one subembodiment, the fifth information block and the third information block are carried by different RRC signalings.

In one subembodiment, the fifth information block is transmitted on a PDSCH.

In one subembodiment, the fifth information block indicates that a TCI codepoint corresponding to the first information element corresponds to P2 parameter groups, P2 being a positive integer greater than 1; the first parameter group is one of the P2 parameter groups; the first information block activates the first parameter group of the P2 parameter groups.

In one embodiment, the first information element comprises the first parameter group.

In one embodiment, the first information element comprises P1 parameter groups, P1 being a positive integer greater than 1; the first parameter group is one of the P1 parameter groups; the first information block activates the first parameter group of the P1 parameter groups.

Embodiment 13

Embodiment 13 illustrates a schematic diagram of a first reference power being used to determine a transmitting power of a first signal according to one embodiment of the present disclosure; as shown in FIG. 13. In Embodiment 13, a transmitting power of the first signal is a smaller value between the first reference power and a first power threshold.

In one embodiment, the first power threshold is a transmitting power threshold of a PUSCH.

In one embodiment, the first power threshold is a transmitting power threshold of a PSSCH.

In one embodiment, the first power threshold is measured by dBm.

In one embodiment, the first power threshold is $P_{CMAX,f,c}(i)$.

In one embodiment, the first power threshold is $P_{CMAX}$.

In one embodiment, the first reference power is measured by dBm.

In one embodiment, a transmitting power of the first signal is measured by dBm.

In one embodiment, a transmitting power of the first signal is a sum of a fifth component and a smaller value between the first reference power and the first power threshold, and the fifth component is related to a bandwidth measured by RBs allocated to the first signal.

Embodiment 14

Embodiment 14 illustrates a schematic diagram of a first parameter group being used to determine a first reference power according to one embodiment of the present disclosure; as shown in FIG. 14.

In one embodiment, the first reference power is linear with a first component, and a linear coefficient between the first reference power and the first component is 1.

In one subembodiment, the first parameter group comprises the first component.

In one subembodiment, the first component is power base.

In one subembodiment, the first component is $P_{0\_PUSCH, b,f,c}(j)$.

In one subembodiment, the first component is $P_0(j)$ used for uplink power control.

In one subembodiment, the first component is $P_0(j)$ used for PUSCH power control.

In one subembodiment, the first component is $P_{0\_PSSCH}$ for PSSCH power control.

In one embodiment, a measurement on a target reference signal is used to determine a first pathloss, the target reference signal being transmitted in a target reference signal resource; the first reference power is linear with the first pathloss, and a linear coefficient between the first reference power and the first pathloss is a first coefficient.

In one subembodiment, the first parameter group comprises an ID of the target reference signal resource.

In one subembodiment, the first parameter group comprises the first coefficient.

In one subembodiment, the target reference signal resource comprises a CSI-RS resource.

In one subembodiment, the target reference signal resource comprises an SSB resource.

In one subembodiment, the target reference signal resource comprises an SRS resource.

In one subembodiment, the first pathloss is equal to a transmitting power of the target reference signal subtracted by a Reference Signal Received Power (RSRP) of the target reference signal.

In one subembodiment, the first coefficient is a non-negative real number less than or equal to 1.

In one subembodiment, the first coefficient is $\alpha_{b,f,c}(j)$.

In one subembodiment, the first coefficient is $\alpha(j)$ used for uplink power control.

In one subembodiment, the first coefficient is $\alpha(j)$ used for PUSCH power control.

In one subembodiment, the first coefficient is $\alpha_{PSSCH}$ used for PSSCH power control.

In one embodiment, the first reference power is linear with a fourth component, and a linear coefficient between the first reference power and the fourth component is 1, the fourth component being a power control adjustment state.

In one subembodiment, the fourth component is $f_{b,f,c}(i, l)$.

In one embodiment, the first parameter group comprises an index of a power control adjustment state for the first signal.

In one embodiment, the first parameter group comprises an index of closed-loop power control for the first signal.

In one embodiment, the first reference power is linear with a second component, and a linear coefficient between the first reference power and the second component is 1; the second component is related to a bandwidth measured by RBs allocated to the first signal.

In one embodiment, the first reference power is linear with a third component, and a linear coefficient between the first reference power and the third component is 1; the third component is related to an MCS of the first signal.

In one subembodiment, the third component is $\Delta_{TF,b,f,c}(i)$.

In one embodiment, the first reference power is linear with the first component, the first pathloss and the second component respectively.

In one embodiment, the first reference power is linear with the first component, the first pathloss, the second component, the third component and the fourth component respectively.

Embodiment 15

Figure 15:
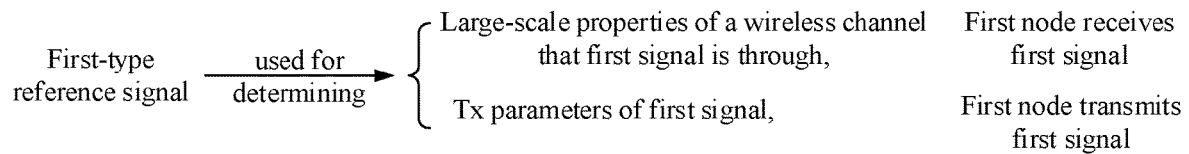
FIG. 15 illustrates a schematic diagram of a first-type reference signal according to one embodiment of the present disclosure.

Embodiment 15 illustrates a schematic diagram of a first-type reference signal according to one embodiment of the present disclosure; as shown in FIG. 15. In FIG. 15, the first-type reference signal is transmitted in the first-type reference signal resource, and a second-type index set comprised by the first information element indicates the first-type reference signal resource; when the first node receives the first signal, the first-type reference signal is used to determine the large-scales properties of a wireless channel over which the first signal is conveyed; when the first node transmits the first signal, the first-type reference signal is used to determine the Tx parameters of the first signal.

In one embodiment, the first-type reference signal comprises a CSI-RS.

In one embodiment, the first-type reference signal comprises a Non Zero Power (NZP) CSI-RS.

In one embodiment, the first-type reference signal comprises an SSB.

In one embodiment, the first-type reference signal comprises an SRS.

In one embodiment, the first-type reference signal resource is reserved for the first-type reference signal.

In one embodiment, the large-scale properties comprise one or more of delay spread, Doppler spread, Doppler shift, average gain, average delay or Spatial Rx parameters.

In one embodiment, when the operating action is receiving, large-scale properties of a channel over which the first signal is conveyed can be inferred from large-scale properties of a channel over which the first-type reference signal is conveyed.

In one embodiment, when the operating action is receiving, the first node receives the first-type reference signal, more specifically, the first node employs a same spatial domain filter to receive the first-type reference signal and the first signal.

In one embodiment, when the operating action is receiving, the first node transmits the first-type reference signal, more specifically, the first node employs a same spatial domain filter to transmit the first-type reference signal and receive the first signal.

In one embodiment, when the operating action is transmitting, large-scale properties of a channel over which the first signal is conveyed can be inferred from large-scale properties of a channel over which the first-type reference signal is conveyed.

In one embodiment, when the operating action is transmitting, the first node transmits the first-type reference signal, more specifically, the first node employs a same spatial domain filter to transmit the first-type reference signal and the first signal.

In one embodiment, when the operating action is transmitting, the first node receives the first-type reference signal, more specifically, the first node employs a same spatial domain filter to receive the first-type reference signal and transmit the first signal.

In one embodiment, the first information element indicates that a related type corresponding to the first-type reference signal is a first related type; when the operating action is receiving, the first-type reference signal and the first related type are jointly used to determine the large-scale properties of a wireless channel over which the first signal is conveyed; when the operating action is transmitting, the first-type reference signal and the first related type are jointly used to determine the Tx parameters of the first signal.

In one subembodiment, the first related type belongs to the first related type set illustrated in Embodiment 8.

In one embodiment, when the operating action is receiving, first-type large-scale properties of a channel over which the first signal is conveyed can be inferred from first-type large-scale properties of a channel over which the first-type reference signal is conveyed; the first related type is used to determine the content contained in the first-type large-scale properties.

In one subembodiment, the first related type is used to determine which of the delay spread, Doppler spread, Doppler shift, average gain, average delay or Spatial Rx parameters is(are) comprised by the first-type large-scale properties.

In one embodiment, when the operating action is transmitting, the first-type reference signal is used to determine first-type Tx parameters of the first signal, and the first related type is used to determine content of the first-type Tx parameters.

In one subembodiment, the first related type is used to determine which of a transmission antenna, a spatial domain filter, a precoding matrix, a precoding vector, a TA or power control parameter is(are) comprised by the first-type Tx parameters.

In one subembodiment, the first node transmits the first-type reference signal and the first signal employing the same first-type Tx parameter(s).

In one subembodiment, a measurement on the first-type reference signal is used to determine the first-type Tx parameters.

In one embodiment, the first information element comprises W3 second-type indexes, W3 being a positive integer greater than 1; the first-type reference signal resource comprises W3 sub-resources, the W3 sub-resources respectively being indicated by the W3 second-type indexes; the first-type reference signal comprises W3 sub-signals, the W3 sub-signals respectively being transmitted in the W3 sub-resources; the W3 sub-signals respectively correspond to different related types.

In one subembodiment, the W3 is equal to 2.

In one subembodiment, the W3 is greater than 2.

In one subembodiment, there is a first sub-signal in the W3 sub-signals; when the operating action is receiving, the first sub-signal is used to determine spatial Rx parameters of the first signal; when the operating action is transmitting, the first sub-signal is used to determine a spatial domain transmission filter for the first signal.

In one subembodiment, there is a second sub-signal in the W3 sub-signals; when the operating action is receiving, the second sub-signal is used to determine a receiving antenna for the first signal; when the operating action is transmitting, the second sub-signal is used to determine a transmitting antenna for the first signal.

Embodiment 16

Figure 16:
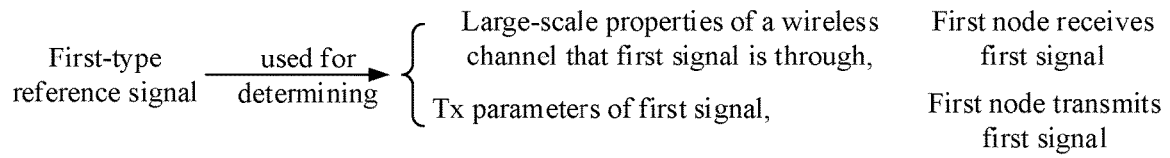
FIG. 16 illustrates a schematic diagram of a third information block according to one embodiment of the present disclosure.

Embodiment 16 illustrates a schematic diagram of a third information block according to one embodiment of the present disclosure; as shown in FIG. 16. In Embodiment 16, the third information block is used to determine the N1 information elements and the N2 information elements.

In one embodiment, the third information block is carried by a higher layer signaling.

In one embodiment, the third information block is carried by an RRC signaling.

In one embodiment, the third information block is transmitted in SideLink.

In one embodiment, the third information block is transmitted in downlink.

In one embodiment, the third information block comprises a positive integer number of information bit(s).

In one embodiment, the third information block comprises information in all or part of fields of an IE.

In one embodiment, the third information block comprises information in all or part of fields of a TCI-State IE.

In one embodiment, the third information block comprises information in all or part of fields of a PDSCH-Config IE.

In one embodiment, the third information block comprises all or part of information in a tci-StatesToAddModList field of a PDSCH-Config IE.

In one embodiment, the third information block comprises a first information sub-block and a second information sub-block, and the first information sub-block and the second information sub-block are respectively carried by different RRC signalings; the first information sub-block indicates the N1 information elements, while the second information sub-block indicates the N2 information elements.

In one subembodiment, the first information sub-block and the second information sub-block respectively comprise information in all or part of fields of a TCI-State IE.

In one embodiment, the third information block indicates the N1 information elements and the N2 information elements.

Embodiment 17

Figure 17:
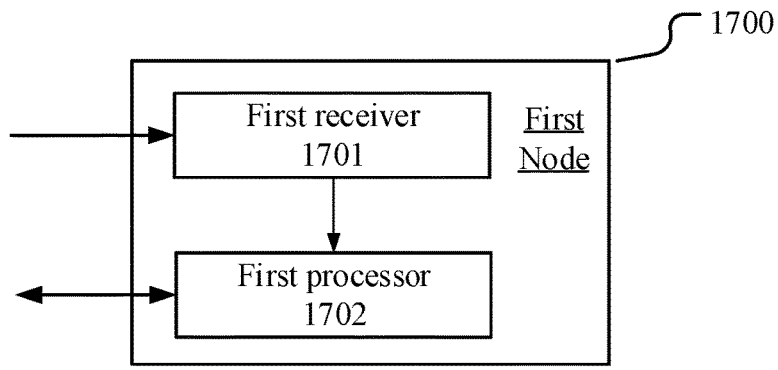
FIG. 17 illustrates a structure block diagram of a processing device in a first node according to one embodiment of the present disclosure.

Embodiment 17 illustrates a structure block diagram of a processing device in a first node according to one embodiment of the present disclosure; as shown in FIG. 17. In FIG. 17, a processing device 1700 in a first node comprises a first receiver 1701 and a first processor 1702.

In Embodiment 17, a first receiver 1701 receives a first information block and a first signaling; the first processor 1702 operates a first signal.

In Embodiment 17, the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the operating action is receiving or transmitting; when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal.

In one embodiment, a first-type index comprised by any information element of the M1 information elements is one of the M first-type indexes, while a first-type index comprised by any information element of the M2 information elements is one of the M first-type indexes.

In one embodiment, a third information element is any information element of the M1 information elements; when there is a fourth information element in the M2 information elements that comprises a first-type index equal to a first-type index comprised by the third information element, a reference signal indicated by a second-type index comprised by the third information element is associated with a reference signal indicated by a second-type index comprised by the fourth information element.

In one embodiment, the first receiver 1701 receives a second information block; herein, the second information block is used to determine Q sub-bands, Q being a positive integer greater than 1; the first signal belongs to one of the Q sub-bands in frequency domain.

In one embodiment, when the operating action is transmitting, the first signaling is used to determine a first parameter group; the first parameter group is used to determine a first reference power, the first reference power being used to determine a transmitting power of the first signal.

In one embodiment, the first processor 1702 receives a first-type reference signal; herein, the first-type reference signal is transmitted in a first-type reference signal resource, and a second-type index set comprised by the first information element indicates the first-type reference signal resource; when the operating action is receiving, the first-type reference signal is used to determine large-scale properties of a wireless channel over which the first signal is conveyed; when the operating action is transmitting, the first-type reference signal is used to determine the Tx parameters of the first signal.

In one embodiment, the first processor 1702 transmits a first-type reference signal; herein, the first-type reference signal is transmitted in a first-type reference signal resource, and a second-type index set comprised by the first information element indicates the first-type reference signal resource; when the operating action is receiving, the first-type reference signal is used to determine large-scale properties of a wireless channel over which the first signal is conveyed; when the operating action is transmitting, the first-type reference signal is used to determine the Tx parameters of the first signal.

In one embodiment, the first receiver 1701 receives a third information block; herein, the third information block is used to determine the N1 information elements and the N2 information elements.

In one embodiment, the first node is a UE.

In one embodiment, the first node is a relay node.

In one embodiment, the first receiver 1701 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 1702 comprises at least one of the antenna 452, the receiver/transmitter 454, the receiving processor 456, the transmitting processor 468, the multi-antenna receiving processor 458, the multi-antenna transmitting processor 457, the controller/processor 459, the memory 460 or the data source 467 in Embodiment 4.

Embodiment 18

Figure 18:
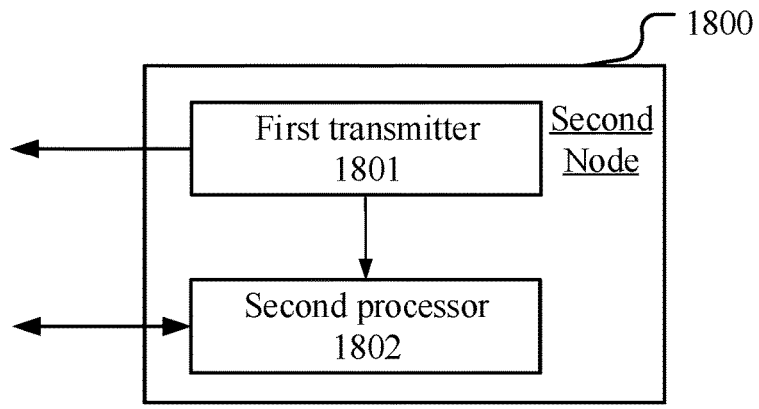
FIG. 18 illustrates a structure block diagram of a processing device in a second node according to one embodiment of the present disclosure.

Embodiment 18 illustrates a structure block diagram of a processing device in a second node according to one embodiment of the present disclosure; as shown in FIG. 18. In FIG. 18, a processing device 1800 in a second node comprises a first transmitter 1801 and a second processor 1802.

In Embodiment 18, a first transmitter 1801 transmits a first information block and a first signaling; a second processor 1802 processes a first signal.

In Embodiment 18, the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; any information element of the N1 information elements and the N2 information elements comprises a first-type index and a second-type index set, and each second-type index set comprises one or more second-type indexes, of which each second-type index indicates a reference signal resource; the first signaling comprises scheduling information of the first signal, and the first signaling indicates a first information element; the processing action is transmitting or receiving; when the processing action is transmitting, the first signaling indicates the first information element out of the M1 information elements, and a second-type index set comprised by the first information element is used to determine Rx parameters of the first signal; when the processing action is receiving, the first signaling indicates the first information element out of the M2 information elements, and a second-type index set comprised by the first information element is used to determine Tx parameters of the first signal.

In one embodiment, a first-type index comprised by any information element of the M1 information elements is one of the M first-type indexes, while a first-type index comprised by any information element of the M2 information elements is one of the M first-type indexes.

In one embodiment, a third information element is any information element of the M1 information elements; when there is a fourth information element in the M2 information elements that comprises a first-type index equal to a first-type index comprised by the third information element, a reference signal indicated by a second-type index comprised by the third information element is associated with a reference signal indicated by a second-type index comprised by the fourth information element.

In one embodiment, the first transmitter 1801 transmits a second information block; herein, the second information block is used to determine Q sub-bands, Q being a positive integer greater than 1; the first signal belongs to one of the Q sub-bands in frequency domain.

In one embodiment, when the processing action is receiving, the first signaling is used to determine a first parameter group; the first parameter group is used to determine a first reference power, the first reference power being used to determine a transmitting power of the first signal.

In one embodiment, the second processor 1802 transmits a first-type reference signal; herein, the first-type reference signal is transmitted in a first-type reference signal resource, and a second-type index set comprised by the first information element indicates the first-type reference signal resource; when the processing action is transmitting, the first-type reference signal is used to determine large-scale properties of a wireless channel over which the first signal is conveyed; when the processing action is receiving, the first-type reference signal is used to determine the Tx parameters of the first signal.

In one embodiment, the second processor 1802 receives a first-type reference signal; herein, the first-type reference signal is transmitted in a first-type reference signal resource, and a second-type index set comprised by the first information element indicates the first-type reference signal resource; when the processing action is transmitting, the first-type reference signal is used to determine large-scale properties of a wireless channel over which the first signal is conveyed; when the processing action is receiving, the first-type reference signal is used to determine the Tx parameters of the first signal.

In one embodiment, the first transmitter 1801 transmits a third information block; herein, the third information block is used to determine the N1 information elements and the N2 information elements.

In one embodiment, the second node is a base station.
In one embodiment, the second node is a UE.
In one embodiment, the second node is a relay node.
In one embodiment, the first transmitter 1801 comprises at least one of the antenna 420, the transmitter 418, the transmitting processor 416, the multi-antenna transmitting processor 471, the controller/processor 475 or the memory 476 in Embodiment 4.

In one embodiment, the second processor 1802 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives a first information block and a first signaling, the first information block comprises a MAC CE, and the first signaling comprises DCI; and
a first processor, which operates a first signal, and receives or transmits a first-type reference signal;
wherein the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; the N1 information elements and the N2 information elements are respectively TCI states configured for downlink and uplink; any information element of the N1 information elements and the N2 information elements comprises a first-type index and a second-type index set, and each second-type index set comprises one or more second-type indexes, of which each second-type index indicates a reference signal resource; a reference signal resource indicated by any second-type index comprised by any information element of the N1 information elements and the N2 information elements is one of a CSI-RS resource, a CSI-RS resource set, a SRS resource, an SRS resource set or a synchronisation signal/physical broadcast channel block resource; the first signaling comprises scheduling information of the first signal, and the first signaling indicates a first information element; the operating action is receiving or transmitting; when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal; the Rx parameters comprise large-scale properties of a channel over which the first signal is conveyed, and the large-scale properties comprise one or more of delay spread, Doppler spread, Doppler shift, average gain, average delay or Spatial Rx parameters; the Tx parameters comprise a spatial domain transmission filter; the first-type reference signal is transmitted in a first-type reference signal resource, and the second-type index set comprised by the first information element indicates the first-type reference signal resource; when the operating action is receiving, the first-type reference signal is used to determine large-scale properties of a wireless channel over which the first signal is conveyed; when the operating action is transmitting, the first-type reference signal is used to determine the Tx parameters of the first signal; the first information block is transmitted on a PDSCH, the first signaling is transmitted on a PDCCH.

2. The first node according to claim 1, wherein the first information block indicates a TCI codepoint corresponding to each first-type index of the M first-type indexes; a first-type index comprised by any information element of the M1 information elements is one of the M first-type indexes, while a first-type index comprised by any information element of the M2 information elements is one of the M first-type indexes; the M1 information elements are used for Downlink, while the M2 information elements are used for Uplink.

3. The first node according to claim 1, wherein the first signaling indicates a TCI codepoint corresponding to a first-type index comprised by the first information element; when the operating action is receiving, the first information element is one of the M1 information elements; when the operating action is transmitting, the first information element is one of M2 information elements.

4. The first node according to claim 1, wherein the first receiver receives at least one of a second information block or a third information block; wherein the second information block is used to determine Q sub-bands, Q being a positive integer greater than 1; any of the Q sub-bands comprises a carrier, or, any of the Q sub-bands comprises a BWP; the first signal belongs to one of the Q sub-bands in frequency domain; the third information block is used to determine the N1 information elements and the N2 information elements.

5. The first node according to claim 1, wherein when the operating action is transmitting, the first signaling is used to determine a first parameter group; the first parameter group is used to determine a first reference power, the first reference power being used to determine a transmitting power of the first signal; the transmitting power of the first signal is a smaller value between the first reference power and a first power threshold; the transmitting power of the first signal is measured by dBm; the first reference power is linear with a first component, and a linear coefficient between the first reference power and the first component is 1; a measurement on a target reference signal is used to determine a first pathloss, the target reference signal being transmitted in a target reference signal resource, the first reference power is linear with the first pathloss, and a linear coefficient between the first reference power and the first pathloss is a first coefficient; the first reference power is linear with a fourth component, and a linear coefficient between the first reference power and the fourth component is 1, the fourth component being a power control adjustment state; the first parameter group comprises at least one of the first component, an ID of the target reference signal resource, the first coefficient, and an index of the power control adjustment state for the first signal.

6. A second node for wireless communications, comprising:
a first transmitter, which transmits a first information block and a first signaling, the first information block comprises a MAC CE, and the first signaling comprises DCI; and a second processor, which processes a first signal, and transmits or receives a first-type reference signal;
wherein the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; the N1 information elements and the N2 information elements are respectively TCI states configured for downlink and uplink; any information element of the N1 information elements and the N2 information elements comprises a first-type index and a second-type index set, and each second-type index set comprises one or more second-type indexes, of which each second-type index indicates a reference signal resource; a reference signal resource indicated by any second-type index comprised by any information element of the N1 information elements and the N2 information elements is one of a CSI-RS resource, a CSI-RS resource set, a SRS resource, an SRS resource set or a synchronisation signal/physical broadcast channel block resource; the first signaling comprises scheduling information of the first signal, and the first signaling indicates a first information element; the processing action is transmitting or receiving; when the processing action is transmitting, the first signaling indicates the first information element out of the M1 information elements, and a second-type index set comprised by the first information element is used to determine Rx parameters of the first signal; when the processing action is receiving, the first signaling indicates the first information element out of the M2 information elements, and a second-type index set comprised by the first information element is used to determine Tx parameters of the first signal; the Rx parameters comprise large-scale properties of a channel over which the first signal is conveyed, and the large-scale properties comprise one or more of delay spread, Doppler spread, Doppler shift, average gain, average delay or Spatial Rx parameters; the Tx parameters comprise a spatial domain transmission filter; the first-type reference signal is transmitted in a first-type reference signal resource, and the second-type index set comprised by the first information element indicates the first-type reference signal resource; when the processing action is transmitting, the first-type reference signal is used to determine large-scale properties of a wireless channel over which the first signal is conveyed; when the processing action is receiving, the first-type reference signal is used to determine the Tx parameters of the first signal; the first information block is transmitted on a PDSCH, the first signaling is transmitted on a PDCCH.

7. The second node according to claim 6, wherein the first information block indicates a TCI codepoint corresponding to each first-type index of the M first-type indexes; a first-type index comprised by any information element of the M1 information elements is one of the M first-type indexes, while a first-type index comprised by any information element of the M2 information elements is one of the M first-type indexes; the M1 information elements are used for Downlink, while the M2 information elements are used for Uplink.

8. The second node according to claim 6, wherein the first signaling indicates a TCI codepoint corresponding to a first-type index comprised by the first information element; when the processing action is transmitting, the first information element is one of the M1 information elements; when the processing action is receiving, the first information element is one of M2 information elements.

9. The second node according to claim 6, wherein the first transmitter transmits at least one of a second information block or a third information block; wherein the second information block is used to determine Q sub-bands, Q being a positive integer greater than 1; any of the Q sub-bands comprises a carrier, or, any of the Q sub-bands comprises a BWP; the first signal belongs to one of the Q sub-bands in frequency domain; the third information block is used to determine the N1 information elements and the N2 information elements.

10. The second node according to claim 6, wherein when the processing action is receiving, the first signaling is used to determine a first parameter group; the first parameter group is used to determine a first reference power, the first reference power being used to determine a transmitting power of the first signal; the transmitting power of the first signal is a smaller value between the first reference power and a first power threshold; the transmitting power of the first signal is measured by dBm; the first reference power is linear with a first component, and a linear coefficient between the first reference power and the first component is 1; a measurement on a target reference signal is used to determine a first pathloss, the target reference signal being transmitted in a target reference signal resource, the first reference power is linear with the first pathloss, and a linear coefficient between the first reference power and the first pathloss is a first coefficient; the first reference power is linear with a fourth component, and a linear coefficient between the first reference power and the fourth component is 1, the fourth component being a power control adjustment state; the first parameter group comprises at least one of the first component, an ID of the target reference signal resource, the first coefficient, and an index of the power control adjustment state for the first signal.

11. A method in a first node for wireless communications, comprising:
receiving a first information block, the first information block comprises a MAC CE;
receiving or transmitting a first-type reference signal;
receiving a first signaling, the first signaling comprises DCI; and
operating a first signal;
wherein the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; the N1 information elements and the N2 information elements are respectively TCI states configured for downlink and uplink; any information element of the N1 information elements and the N2 information elements comprises a first-type index and a second-type index set, and each second-type index set comprises one or more second-type indexes, of which each second-type index indicates a reference signal resource; a reference signal resource indicated by any second-type index comprised by any information element of the N1 information elements and the N2 information elements is one of a CSI-RS resource, a CSI-RS resource set, a SRS resource, an SRS resource set or a synchronisation signal/physical broadcast channel block resource; the first signaling comprises scheduling information of the first signal, and the first signaling indicates a first information element; the operating action is receiving or transmitting; when the operating action is receiving, the first signaling indicates the first information element out of the M1 information elements, and a second-type index set comprised by the first information element is used to determine Rx parameters of the first signal; when the operating action is transmitting, the first signaling indicates the first information element out of the M2 information elements, and a second-type index set comprised by the first information element is used to determine Tx parameters of the first signal; the Rx parameters comprise large-scale properties of a channel over which the first signal is conveyed, and the large-scale properties comprise one or more of delay spread, Doppler spread, Doppler shift, average gain, average delay or Spatial Rx parameters; the Tx parameters comprise a spatial domain transmission filter; the first-type reference signal is transmitted in a first-type reference signal resource, and the second-type index set comprised by the first information element indicates the first-type reference signal resource; when the operating action is receiving, the first-type reference signal is used to determine large-scale properties of a wireless channel over which the first signal is conveyed; when the operating action is transmitting, the first-type reference signal is used to determine the Tx parameters of the first signal; the first information block is transmitted on a PDSCH, the first signaling is transmitted on a PDCCH.

12. The method according to claim 11, wherein the first information block indicates a TCI codepoint corresponding to each first-type index of the M first-type indexes; a first-type index comprised by any information element of the M1 information elements is one of the M first-type indexes, while a first-type index comprised by any information element of the M2 information elements is one of the M first-type indexes; the M1 information elements are used for Downlink, while the M2 information elements are used for Uplink.

13. The method according to claim 11, wherein the first signaling indicates a TCI codepoint corresponding to a first-type index comprised by the first information element; when the operating action is receiving, the first information element is one of the M1 information elements; when the operating action is transmitting, the first information element is one of M2 information elements.

14. The method according to claim 11, comprising at least one of:
receiving a second information block; or
receiving a third information block;
wherein the second information block is used to determine Q sub-bands, Q being a positive integer greater than 1; any of the Q sub-bands comprises a carrier, or, any of the Q sub-bands comprises a BWP; the first signal belongs to one of the Q sub-bands in frequency domain; the third information block is used to determine the N1 information elements and the N2 information elements.

15. The method according to claim 11, wherein when the operating action is transmitting, the first signaling is used to determine a first parameter group; the first parameter group is used to determine a first reference power, the first reference power being used to determine a transmitting power of the first signal; the transmitting power of the first signal is a smaller value between the first reference power and a first power threshold; the transmitting power of the first signal is measured by dBm; the first reference power is linear with a first component, and a linear coefficient between the first reference power and the first component is 1; a measurement on a target reference signal is used to determine a first pathloss, the target reference signal being transmitted in a target reference signal resource, the first reference power is linear with the first pathloss, and a linear coefficient between the first reference power and the first pathloss is a first coefficient; the first reference power is linear with a fourth component, and a linear coefficient between the first reference power and the fourth component is 1, the fourth component being a power control adjustment state; the first parameter group comprises at least one of the first component, an ID of the target reference signal resource, the first coefficient, and an index of the power control adjustment state for the first signal.

16. A method in second node for wireless communications, comprising:
    transmitting a first information block, the first information block comprises a MAC CE;
    receiving or transmitting a first-type reference signal;
    transmitting a first signaling, the first signaling comprises DCI; and
    processing a first signal;
    wherein the first information block is used to determine M first-type indexes out of N first-type indexes, M being a positive integer greater than 1, and N being a positive integer no less than M; the M first-type indexes are used to determine M1 information elements out of N1 information elements, and the M first-type indexes are used to determine M2 information elements out of N2 information elements, M1 and M2 respectively being positive integers greater than 1 and no greater than M, N1 being a positive integer no less than M1, and N2 being a positive integer no less than M2; the N1 information elements and the N2 information elements are respectively TCI states configured for downlink and uplink; any information element of the N1 information elements and the N2 information elements comprises a first-type index and a second-type index set, and each second-type index set comprises one or more second-type indexes, of which each second-type index indicates a reference signal resource; a reference signal resource indicated by any second-type index comprised by any information element of the N1 information elements and the N2 information elements is one of a CSI-RS resource, a CSI-RS resource set, a SRS resource, an SRS resource set or a synchronisation signal/physical broadcast channel block resource; the first signaling comprises scheduling information of the first signal, and the first signaling indicates a first information element; the processing action is transmitting or receiving; when the processing action is transmitting, the first signaling indicates the first information element out of the M1 information elements, and a second-type index set comprised by the first information element is used to determine Rx parameters of the first signal; when the processing action is receiving, the first signaling indicates the first information element out of the M2 information elements, and a second-type index set comprised by the first information element is used to determine Tx parameters of the first signal; the Rx parameters comprise large-scale properties of a channel over which the first signal is conveyed, and the large-scale properties comprise one or more of delay spread, Doppler spread, Doppler shift, average gain, average delay or Spatial Rx parameters; the Tx parameters comprise a spatial domain transmission filter; the first-type reference signal is transmitted in a first-type reference signal resource, and the second-type index set comprised by the first information element indicates the first-type reference signal resource; when the processing action is transmitting, the first-type reference signal is used to determine large-scale properties of a wireless channel over which the first signal is conveyed; when the processing action is receiving, the first-type reference signal is used to determine the Tx parameters of the first signal; the first information block is transmitted on a PDSCH, the first signaling is transmitted on a PDCCH.

17. The method according to claim 16, wherein the first information block indicates a TCI codepoint corresponding to each first-type index of the M first-type indexes; a first-type index comprised by any information element of the M1 information elements is one of the M first-type indexes, while a first-type index comprised by any information element of the M2 information elements is one of the M first-type indexes; the M1 information elements are used for Downlink, while the M2 information elements are used for Uplink.

18. The method according to claim 16, wherein the first signaling indicates a TCI codepoint corresponding to a first-type index comprised by the first information element; when the processing action is transmitting, the first information element is one of the M1 information elements; when the processing action is receiving, the first information element is one of M2 information elements.

19. The method according to claim 16, comprising at least one of:
    transmitting a second information block; or
    transmitting a third information block;
    wherein the second information block is used to determine Q sub-bands, Q being a positive integer greater than 1; any of the Q sub-bands comprises a carrier, or, any of the Q sub-bands comprises a BWP; the first signal belongs to one of the Q sub-bands in frequency domain; the third information block is used to determine the N1 information elements and the N2 information elements.

20. The method according to claim 16, wherein when the processing action is receiving, the first signaling is used to determine a first parameter group; the first parameter group is used to determine a first reference power, the first reference power being used to determine a transmitting power of the first signal; the transmitting power of the first signal is a smaller value between the first reference power and a first power threshold; the transmitting power of the first signal is measured by dBm; the first reference power is linear with a first component, and a linear coefficient between the first reference power and the first component is 1; a measurement on a target reference signal is used to determine a first pathloss, the target reference signal being transmitted in a target reference signal resource, the first reference power is linear with the first pathloss, and a linear coefficient between the first reference power and the first pathloss is a first coefficient; the first reference power is linear with a fourth component, and a linear coefficient between the first reference power and the fourth component is 1, the fourth component being a power control adjustment state; the first parameter group comprises at least one of the first component, an ID of the target reference signal resource, the first coefficient, and an index of the power control adjustment state for the first signal.

* * * * *